(12) United States Patent
Puglieli et al.

(10) Patent No.: US 12,360,202 B1
(45) Date of Patent: Jul. 15, 2025

(54) SYSTEM FOR CENTRALIZED PROCESSING OF LOOSELY SYNCHRONIZED RADARS

(71) Applicant: Zendar Inc., Berkeley, CA (US)

(72) Inventors: Antonio Puglieli, Oakland, CA (US); Stefan Zechner, Weißensberg (DE); Florian Engels, Wangen (DE); Griffin Foster, Berkeley, CA (US); Vinayak Nagpal, Berkeley, CA (US); Ching Ming Wang, El Cerrito, CA (US); Pierre-Louis Blossier, Paris (FR); Arnaud Louys, Annecy (FR); Andreas Donges, Lindau (DE); Kyle Retan, Friedrichshafen (DE); Jonathan Bechter, Vöhringen (DE); Uwe Lüthin, Kressbronn (DE)

(73) Assignee: Zendar Inc., Berkeley, CA (US)

( * ) Notice: Subject to any disclaimer, the term of this patent is extended or adjusted under 35 U.S.C. 154(b) by 0 days.

(21) Appl. No.: 19/033,208

(22) Filed: Jan. 21, 2025

Related U.S. Application Data

(63) Continuation of application No. PCT/US2025/011465, filed on Jan. 13, 2025.

(60) Provisional application No. 63/620,681, filed on Jan. 12, 2024.

(51) Int. Cl.
*G01S 7/292* (2006.01)
*G01S 7/03* (2006.01)
*G01S 7/40* (2006.01)
*G01S 7/41* (2006.01)
(Continued)

(52) U.S. Cl.
CPC .............. *G01S 7/292* (2013.01); *G01S 7/03* (2013.01); *G01S 7/40* (2013.01); *G01S 7/41* (2013.01); *G01S 13/87* (2013.01); *G01S 2013/93271* (2020.01); *G01S 2013/93275* (2020.01)

(58) Field of Classification Search
CPC .......... G01S 13/931; G01S 7/292; G01S 7/40; G01S 7/41; G01S 13/87
See application file for complete search history.

(56) References Cited

U.S. PATENT DOCUMENTS

| | | | |
|---|---|---|---|
| 7,183,969 B2 * | 2/2007 | Pozgay | G01S 13/87 |
| | | | 342/174 |
| 10,641,881 B2 * | 5/2020 | Searcy | G01S 7/032 |
| 10,775,481 B1 * | 9/2020 | Puglielli | G01S 7/4091 |

(Continued)

*Primary Examiner* — Peter M Bythrow
(74) *Attorney, Agent, or Firm* — Brake Hughes Bellermann LLP

(57) ABSTRACT

The present disclosure provides a systems and methods for processing radar data. In one example embodiment, a first digitized radar signal of an environment is received from a first radar module and a second digitized radar signal of the environment is received from a second radar module. The first digitized radar signal and the second digitized radar signal are processed, via an electronic processor, to determine a set of correction parameters. A first corrected radar signal is determined by applying the set of correction parameters to the first digitized radar signal. A second corrected radar signal is determined by applying the set of correction parameters to the second digitized radar signal. The first and second corrected radar signals are combined into a combined radar signal. A scene representation of the environment is determined based on the combined radar signal. The scene representation is provided to an autonomous driving system.

30 Claims, 9 Drawing Sheets

(51) Int. Cl.
  *G01S 13/87* (2006.01)
  *G01S 13/931* (2020.01)

(56) References Cited

U.S. PATENT DOCUMENTS

2006/0132357 A1* 6/2006 Pozgay ................ G01S 7/4004
                                                342/174
2021/0088624 A1* 3/2021 Puglielli ................ G01S 13/42
2022/0365173 A1* 11/2022 Moehlmann .......... G01S 7/4017

* cited by examiner

SYSTEM FOR CENTRALIZED PROCESSING OF LOOSELY SYNCHRONIZED RADARS

CROSS-REFERENCE TO RELATED APPLICATION

This application is a continuation of International Application No. PCT/US2025/011465, filed Jan. 13, 2025, which claims priority to U.S. Provisional Application No. 63/620,681, filed on Jan. 12, 2024, each of which is incorporated herein by reference in its entirety.

BACKGROUND

Radio Detection and Ranging (radar) can be used in many applications including object detection, range-finding, direction-finding, and mapping. Traditionally, radar has been used in aerial vehicles, satellites, and maritime vessels to locate objects and image terrain. In recent years, radar has become increasingly popular in automobiles for applications such as blind-spot detection, collision avoidance, and autonomous driving. Unlike optical-based sensors (such as cameras or Light Detection and Ranging (LIDAR) systems), which are affected by changing weather and visibility, radar functions in low light conditions, in the dark, and under all types of weather conditions.

SUMMARY

Embodiments of the present disclosure are generally directed to systems and methods that determine a three-dimensional (3D) scene representation of an environment based on a by processing incoming radar signals based on a model fitting approach.

Recognized herein are various limitations with radar systems currently available. In order to take advantage of radar, vehicles may be equipped with multiple radar and other type sensors to detect obstacles and objects in the surrounding environment. However, the multiple radar sensors in current radar systems may typically process data independently of one another. Provided herein are systems and methods for processing and combining radar data as well as data received from other sensors (e.g., imaging, LIDAR, and the like). The performance and robustness of radar systems may be improved by combining data from multiple sensors or modules prior to the perception, detection, or classification of objects or obstacles in a surrounding environment. Further, the radar systems disclosed herein may be configured to resolve computational ambiguities involved with processing and coherently combining radar data from multiple radar sensors or modules, in order to identify nearby objects or obstacles and generate one or more local maps of the surrounding environment.

Generally, vehicle radar systems include one or more transmit (TX) antennas and one or more receive (RX) antennas. Each transmit antenna is energized by a transmitter circuit that generates an outgoing signal of electromagnetic waves. These electromagnetic waves emitted by the TX circuit/antenna interact with objects in a surrounding environment and are reflected back to the vehicle/radar system. Each receive antenna receives the reflected signal (originating from one or more of the transmit antennas) and feeds the signal into a receiver circuit. The receiver circuit conditions and digitizes the signal. In some embodiments, the described system processes emitted and sensed signals and, based on the relationship between them, determine various aspects about the environment.

Angular resolution, angular accuracy, and sensitivity are important specifications for an automotive radar system. Both specifications are typically improved by using more complex hardware, in particular by increasing the number of RX and TX channels in the radar sensor. A standard, high-volume automotive radar sensor today uses four RX and three to four TX channels. Such a sensor can be sold in high volume (10 s of millions per year) for very low cost.

Moreover, the state-of-the-art solution includes a so-called imaging radar which uses a very large number of channels to achieve high performance. Some examples include: 1) imaging radars using multiple "cascaded" RF chips where a typical such radar may have RX by TX configuration of 8×8, 16×12, 16×16, 24×24, 32×32, or any other such configuration from multiple radio frequency (RF) chips (clock, trigger, and local oscillator (LO) sync signals are typically shared on the board between chips) and 2) imaging radars using a single, high channel-count chip where each chip may contain a large number of RX and TX elements with many synchronization signals shared between channels inside the chip. However, these state-of-the-art solutions are expensive and include physically large hardware (e.g., a large number or size of chips used, the large physical size of the sensor, and the high-power dissipation of this hardware).

In some embodiments, the described system solves these challenges using multiple low-cost, standard sensors and combining their signals at the data level to outperform the imaging radar. In some embodiments, an LO signal is not shared among separate sensors. In some embodiments, these sensors share degraded trigger or clock signals. These configurations significantly reduce the hardware complexity and cost while that described system is employed to recover precise synchronization and alignment between sensors allowing them to operate as one, complex system with very high performance.

It is appreciated that methods in accordance with the present disclosure can include any combination of the aspects and features described herein. That is, methods in accordance with the present disclosure are not limited to the combinations of aspects and features specifically described herein but also may include any combination of the aspects and features provided.

The details of one or more embodiments of the present disclosure are set forth in the accompanying drawings and the description below. Other features and advantages of the present disclosure will be apparent from the description and drawings, and from the claims.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede or take precedence over any such contradictory material.

BRIEF DESCRIPTION OF THE DRAWINGS

A better understanding of the features and advantages of the present subject matter will be obtained by reference to the following detailed description that sets forth illustrative embodiments and the accompanying drawings (also "Figure" and "FIG." herein) of which.

DETAILED DESCRIPTION

Figure 1:
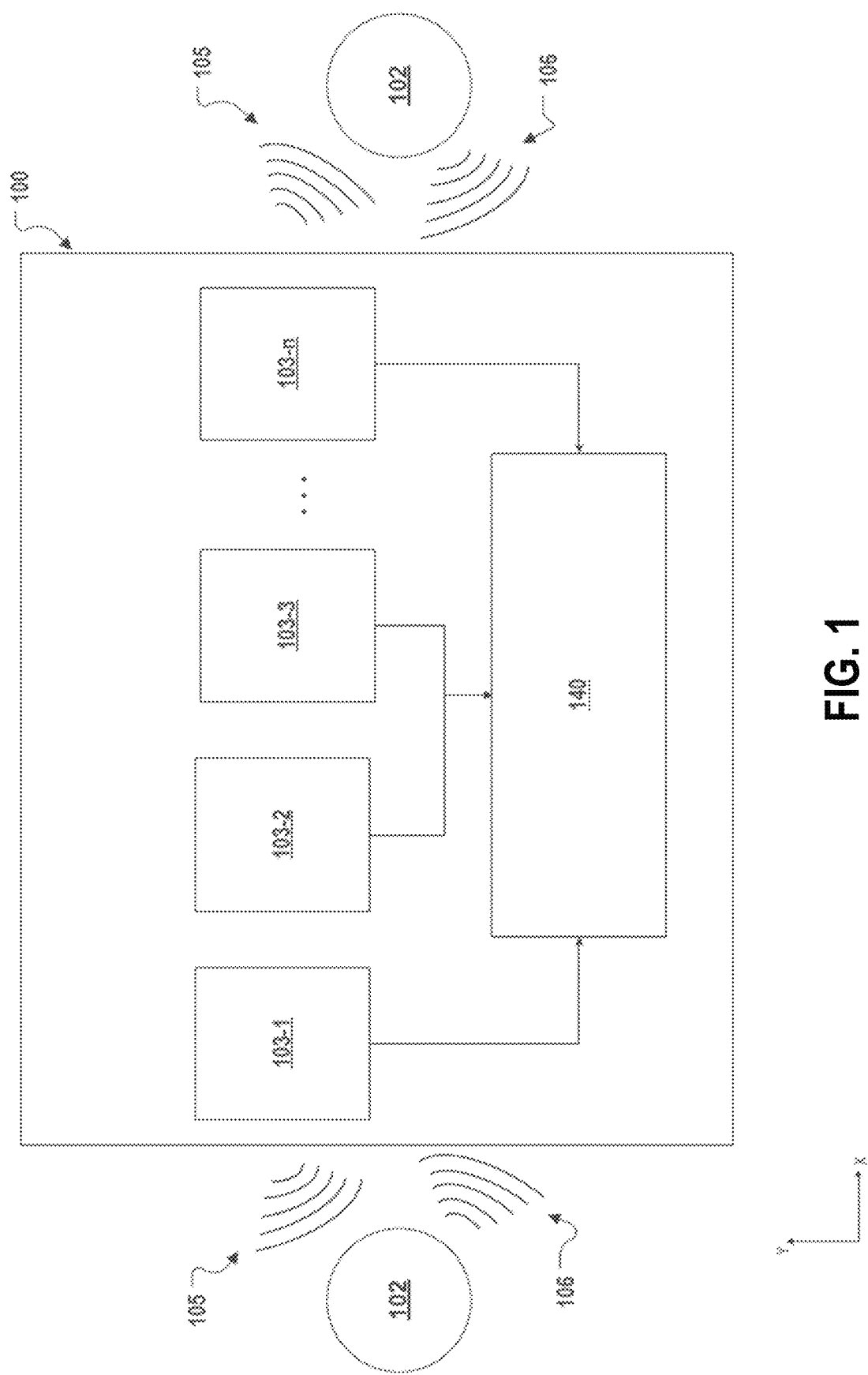
FIG. 1 depicts a system for processing radar data, in accordance with some embodiments.

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the term "radar module" includes a self-contained hardware unit inside a single enclosure, with internal transmit and receive antennas.

As used herein, the term "local oscillator (LO)" refers both to the RF carrier signal as well as the circuit which generates that signal.

As used herein, the term radar frame includes a sequence of chirps which is jointly processed in a phase-coherent way.

As used herein, the term "frame trigger" includes a signal which launches a radar frame.

As used herein, the term "reference clock" includes the base frequency reference signal, which all other clock or frequency signals are generated as a multiple of. For instance, the LO signal is a multiplication of the reference frequency.

As used herein, the term "multiple-input, multiple-output (MIMO)" includes a waveform scheme allowing multiple transmit signals to be fired and separated out in signal processing to identify the contribution from each TX.

As used herein, the term "monostatic signal" includes a baseband signal where the RX path and TX path form part of the same radar module and therefore share all timing and frequency signals.

As used herein, the term "bistatic signal" includes a baseband signal where the RX path and TX path form part of different radar modules.

As used herein, the term "extrinsic" includes the 3D position and 3D orientation of a sensor with respect to some origin position and coordinate system axes.

As used herein, the term "azimuth" includes horizontal angle with respect to the radar or vehicle.

As used herein, the term "elevation" includes a vertical angle with respect to the radar or vehicle.

As used herein, the term "range" includes a radial distance from the radar to a target.

As used herein, the term "doppler" includes the radial speed from the radar to a target.

As used herein, the term "range-doppler" includes the data spectrum formed by computing the range and Doppler transforms of the digitized received radar signal.

As used herein, the term "beam spectrum" includes the data spectrum formed by computing the range, Doppler, azimuth, and elevation transforms of the digitized received radar signal.

As used herein, the term "beamforming" includes the process of computing the beam spectrum.

As used herein, the term "model-fitting" includes the process of estimating parameters of each detected radar target. Some of those parameters could include interpolated range, Doppler, azimuth, and elevation parameters, along with signal-to-noise ratio (SNR) and radar cross section (RCS).

Target Detection/Classification

The described system may be configured to detect or classify one or more targets in a surrounding environment. Detecting a target may involve identifying a presence of a target in a vicinity of the vehicle. Classifying a target may involve determining whether a target is stationary or moving or determining whether or not the target is positioned relative to the vehicle such that the target obstructs or partially obstructs a path of motion of the vehicle. A target may be any object external to the vehicle. A target may be a living being or an inanimate object. A target may be a pedestrian, an animal, a vehicle, a building, a signpost, a sidewalk, a sidewalk curb, a fence, a tree, or any object that may obstruct a vehicle traveling in any given direction. A target may be stationary, moving, or capable of movement.

A target may be located in the front, rear, or lateral side of the vehicle. A target may be positioned at a range of at least about 1 meter (m), 2 m, 3 m, 4 m, 5 m, 10 m, 15 m, 20 m, 25 m, 50 m, 75 m, or 100 m from the vehicle. A target may be located on the ground, in the water, or in the air. A target may be located on or near a motion path of the vehicle. A target may be oriented in any direction relative to the vehicle. A target may be oriented to face the vehicle or oriented to face away from the vehicle at an angle ranging from 0 to about 360 degrees. In some cases, a target may comprise multiple targets external to a terrestrial vehicle.

A target may have a spatial disposition or characteristic that may be measured or detected. Spatial disposition information may include information about the position, velocity, acceleration, or other kinematic properties of the target relative to the terrestrial vehicle. A characteristic of a target may include information on the size, shape, orientation, or material properties of the target. Material properties may include reflectivity or a radar cross section of the target. In some cases, a characteristic of a target may comprise a measurement of an angle of arrival of the target relative to the vehicle. The angle of arrival may correspond to an elevation angle or an azimuth angle associated with an incoming radar signal that is reflected from the target and received at the vehicle.

In some embodiments, a target may have a size of at least 0.2 meters, be in a side facing direction of a terrestrial vehicle and be at least about 1 meter from a terrestrial vehicle. In some embodiments, a target may have a size of at least 0.2 meters, be in a forward or rear facing direction of a terrestrial vehicle and be at least about 1 meter from a terrestrial vehicle. A surrounding environment may be a location or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (nighttime, heavy precipitation, fog, particulates in the air). A surrounding environment may include targets that are on a travel path of a vehicle. A surrounding environment may include targets that are outside of a travel path of a vehicle.

Overview

Angular resolution is a key parameter of an automotive radar and is generally used to determine how well a radar sensor is able to separate closely spaced objects in an environment (rather than seeing only a single, combined object) or to measure the full extent of an object. Generally, the angular resolution of an automotive radar depends on the overall arrangement of TX and RX antennas. In some embodiments, multiple TX or multiple RX antennas (referred to as an antenna array) are employed and the angular resolution is determined by the aperture, or overall extent of all antennas in the system.

In a simplified sense, the aperture size is the distance between left-most TX antenna and right-most TX antenna plus the distance between left-most RX antenna and right-most RX antenna. Moreover, because antenna arrays are 2D, in some embodiments, a horizontal aperture and a vertical aperture are characterized and referred to as the aperture of the radar. Similarly, a horizontal (or "azimuth") resolution and a vertical (or "elevation") resolution may also be described. Generally, improved resolution is achieved by having a larger aperture. For example, when the horizontal aperture is 10 centimeters (cm), two times (2×) horizontal resolution is achieved compared to a horizontal aperture at 5 cm.

In traditional radar systems, every TX circuit and every RX circuit shares several signals. For example, an LO signal, which is at the carrier frequency of the signal or a small sub-harmonic of it (e.g., ½, ⅓, or ¼ of the carrier frequency). This signal is shared so that all TX and RX circuits share the same phase reference. A timing signal or trigger may also be shared among the TX and RX circuits. Generally, a timing signal aligns either each radar pulse or a finite sequence of pulses (typically of order 100-1000 pulses). This signal is shared so that all TX and RX circuits transmit and sample at exactly the same time. The circuits may also share a low-frequency reference clock, which is used by all circuits in the RX or TX to generate other frequency signals such as ADC sampling clock, internal timing signals, and the like. Generally, this signal is shared so that every circuit in the system agrees exactly on a common definition of frequency. Broadly speaking, the described system may be employed to increase the aperture of a radar system without having to share the above three signals among the RX and TX circuits.

Example Systems

FIG. 1 depicts an example of a system 100 for processing radar data. The system 100 may comprise a processor 140 communicably coupled to a plurality of radar modules 103-1, 103-2, 103-3, and so on, up to an nth radar module 103-$n$ where n may be any integer. In some cases, n may be greater than or equal to 1, 2, 3, 4, 5, 6, 7, 8, 9, 10, or more. Each of the plurality of radar modules may be configured to transmit a first set of signals. The first set of signals may comprise a plurality of outgoing radar pulses 105 (e.g., signals). Each of the plurality of radar modules may be configured to receive a second set of signals reflected from a target 102 in a surrounding environment. The second set of signals may be a subset of the first set of signals transmitted by each of the plurality of radar modules and may be generated upon the subset of the first set of signals interacting with or reflecting off of a target 102. The second set of signals may comprise a plurality of incoming radar pulses 106 (e.g., signals).

The plurality of radar modules 103-$n$ may each comprise a radar transmitter or a radar receiver. The radar transmitter may comprise a transmitting antenna. The radar receiver may comprise a receiving antenna. A transmitting antenna may be any antenna (e.g., dipole, directional, patch, sector, Yagi, parabolic, grid) that can convert electrical signals into electromagnetic waves and transmit the electromagnetic waves. A receiving antenna may be any antenna (e.g., dipole, directional, patch, sector, Yagi, parabolic, grid) that can receive electromagnetic waves and convert the electromagnetic radiation waves into electrical signals. In some cases, each of the radar modules 103-$n$ may have a plurality of RX or TX channels. In some embodiments, some of the radar modules 103-$n$ may have only transmitters or only receivers.

The transmit and receive antennas on each module of the plurality of modules 103-$n$ may be arranged into an antenna array. The aperture of the antenna array may define the azimuth and elevation angular resolution which can be achieved with that radar module. In some cases, the receive antennas may be arranged in a one-dimensional or two-dimensional pattern. In some cases, the transmit antennas may be arranged in a one-dimensional or two-dimensional pattern. In some embodiments, the plurality of modules 103-$n$ may have the same antenna array. In some embodiments, the plurality of modules 103-$n$ may have different antenna arrays.

The antenna arrangement pattern may have uniform or non-uniform spacing and may have minimum spacing of a multiple of the wavelength, where said multiple may be one-half, one, one and one-half, two, or any other multiple. For example, when a radar module has N receivers and M transmitters, there are ½*N*M baselines corresponding to the pairwise spacing between each receiver and transmitter. In some embodiments, the antenna array is designed such that no baseline is repeated within the set of ½*N*M baselines (a minimum redundancy array). In some embodiments, the antenna array is designed such that each individual baseline is greater than the Nyquist criterion. This allows a larger aperture and therefore improved angular resolution and additionally avoids antenna coupling and physical challenges in routing antenna feedlines. However, such a design may cause ambiguities in angle estimation. Accordingly, in some embodiments, the antenna array is designed such that the greatest common denominator of the set of ½*N*M baselines meets the Nyquist criterion (e.g., the greatest common denominator is one-half wavelength in case of a 180-degree field of view), to mitigate these ambiguities.

Each radar module of the plurality of radar modules 103-n may be configured to transmit a first set of radar signals comprising a plurality of outgoing radar pulses. The plurality of outgoing radar pulses may comprise a radar pulse. A radar pulse may be any electromagnetic wave or signal transmitted by a radar module within a frequency range of about 1 megahertz (MHz) to about 300 gigahertz (GHz). In some cases, the plurality of outgoing radar pulses may have a frequency of 24 GHz, 60 GHz, or 79 GHz.

The plurality of outgoing pulses may be modulated in time, amplitude, frequency, or phase. In some cases, the plurality of outgoing pulses may be frequency-modulated continuous wave (FMCW) or phase-modulated continuous wave (PMCW) signals. In some embodiments, each pulse or each frame may have a different center frequency (sometimes referred to as stepped FMCW). In some cases, the signals transmitted by each transmitter may be varied according to a MIMO scheme. For example, the signals transmitted by each transmitter may be separated in time, frequency, or code. In some embodiments, time division multiplexing is accomplished by firing transmitters at different times, such that the incoming pulses 106 are only due to a single outgoing pulse 105. In some embodiments, code multiplexing is accomplished by having all transmitters active at the same time and transmitting in the same frequency band, but the outgoing pulses 105 are each coded with a different code. This achieves higher output power and sensitivity than time multiplexing. In the case of FMCW modulated pulses, coding of each outgoing signal may be done over a finite sequence of pulses, whereby each transmitter applies a unique phase sequence to its outgoing pulses 105. In some embodiments, the unique phase sequence is a pseudo-noise sequence (pseudo-noise coded MIMO) or a linear phase progression with unique slope (linear coded MIMO). As described here, time or phase MIMO coding can be implemented without frequency multiplexing, which means that all transmitters fire in an identical frequency band. In other embodiments, it may be desired to multiplex the TX signals in both time and frequency, or alternatively in both code and frequency.

In some cases, the plurality of radar modules 103-n may use a MIMO scheme for multiplexing all transmitters within one module, and a different MIMO scheme for multiplexing all modules. For example, all transmitters within one module may be code-multiplexed while the modules are time-multiplexed. In this case, all transmitters from a first module fire simultaneously, while all transmitters from a second module fire with a time offset relative to the first module. In some cases, the intra-module and inter-module MIMO schemes may be the same. In this case, there is one common MIMO scheme across at least two of the radar modules 103-n. For example, all transmitters within a first module may be code-multiplexed and all transmitters in a second module may be also code-multiplexed along with the first module. In this case, all transmitters from the first and the second module fire simultaneously and in the same frequency band and are assigned unique codes.

It is useful to define the concept of physical radar as follows; a first physical radar includes the first module transmitting outgoing pulses 105-1 and receiving incoming pulses 106-1 (monostatic signals), and a second physical radar includes the second module transmitting outgoing pulses 105-2 and receiving incoming pulses 106-2.

In the case of FMCW modulation, when a first radar module and a second radar module are code-multiplexed, then it becomes possible for the second module to receive the first module's outgoing pulses 105, and vice versa. In this case, a first physical radar includes outgoing pulses 105-1 and incoming pulses 106-1 and a second physical radar includes outgoing pulses 105-2 and incoming pulses 106-2. It is useful to define the concept of virtual radar in this case as follows: a first virtual radar includes outgoing pulses 105-1 received by the second radar module as incoming pulses 106-2 (bistatic signals), and a second virtual radar includes outgoing pulses 105-2 received by the first radar module as incoming pulses 106-1. The virtual radars provide different and complementary information about the tarter 102 (e.g., an object) to that provided by the physical radars.

The system 100 may further comprise a processor 140 operatively coupled to and in communication with each of the plurality of radar modules. Each of the plurality of radar modules may be configured to provide the second set of radar signals or the plurality of incoming radar pulses 106 respectively received by each of the plurality of radar modules to the processor 140. In some embodiments, the processor 140 is configured to process the incoming radar pulses 106 received by the radar modules 103-n. In some embodiments, the plurality of incoming radar pulses 106 may be pre-processed by radar module 103-n prior to being sent to the processor 140 through, for example, digitization, windowing, Fourier transforms, filtering, or data compression.

In some embodiments, the processor 140 is configured to process the incoming radar pulses 106 through one or more signal processing steps. Example signal processing steps include Fourier transforms, filtering, interpolation, extrapolation, downsampling, upsampling, resampling, windowing, parameter estimation, subspace decomposition, maximum likelihood estimation, thresholding, and the like. In some embodiments, the processor 140 is configured to provide output to an autonomous driving system. In some embodiments, the autonomous driving system includes an adaptive cruise control (ACC) system, an automatic emergency braking (AEB) system, an advanced driving assistance system (ADAS), or an active safety system. In some embodiments, the provided output includes one or more of the following: a point cloud; a detection mask (e.g., that breaks up and labels the incoming radar pulses 106 as either signal or noise components); a data spectrum that includes, for example, range, Doppler, azimuth angle, or elevation angle; clusters of points; clusters of points with estimated tracks; point-specific features that include, for example, range, Doppler, ground speed, ground velocity, azimuth angle, elevation angle, height, or object class (e.g., car, pedestrian, truck, motorcycle, and the like); object-specific features that include, for example, type, size, shape, orientation, bounding box, speed, velocity, acceleration, turn rate, and the like; ego-vehicle properties that include, for example, turn rate, velocity, acceleration, speed, and the like; environment properties that include, for example, the vehicle's safe drivable area.

Figure 2:
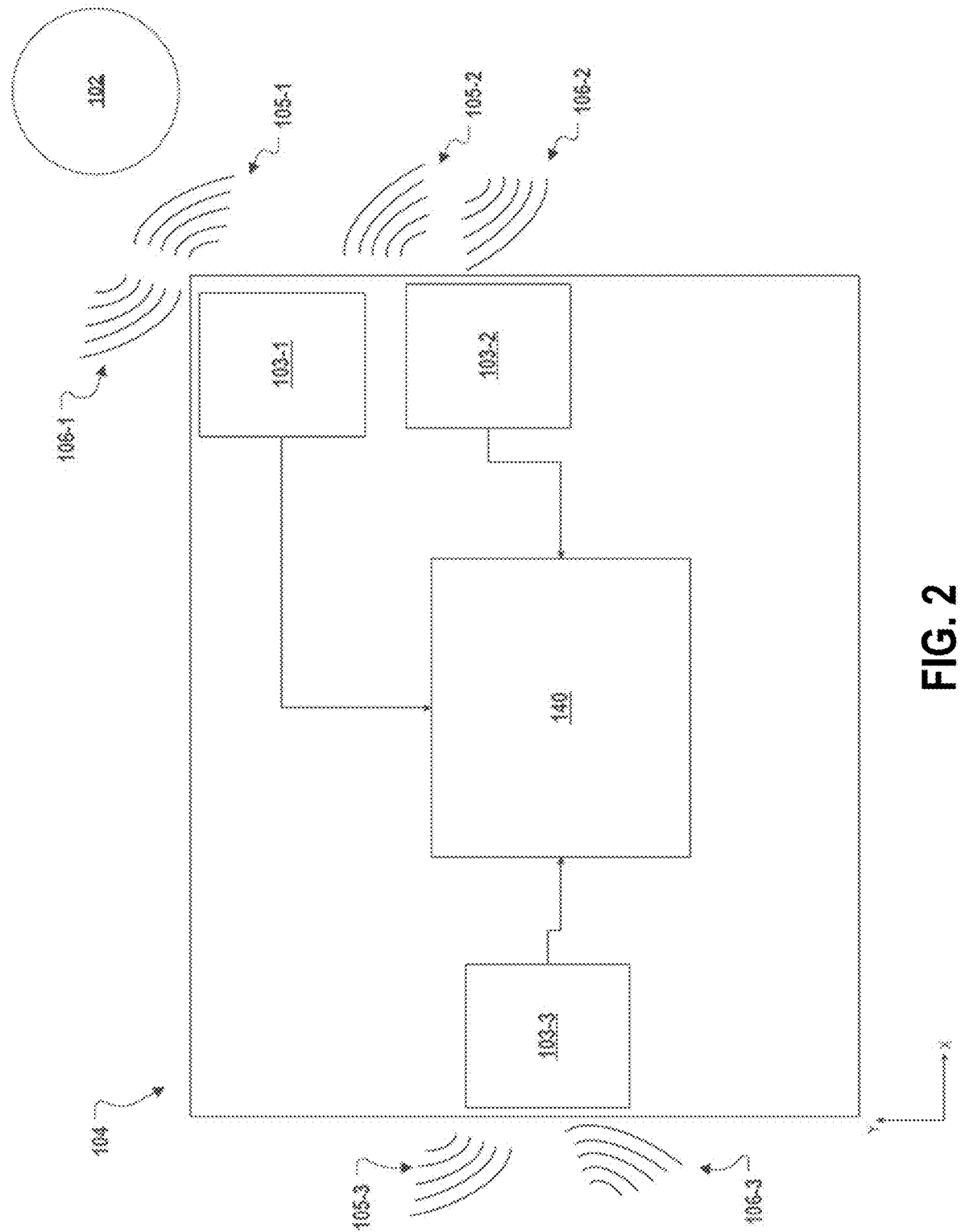
FIG. 2 depicts a system configured to process radar data from a subset of a plurality of radar modules, in accordance with some embodiments.

FIG. 2 depicts a system configured to process radar data from a subset of a plurality of radar modules 103-1, 103-2, and 103-3. The particular number and arrangement of the radar modules depicted in FIG. 2 is simply illustrative, and any number and arrangement of radar modules may be included within a system for processing radar data.

The plurality of radar modules 103-1, 103-2, and 103-3 may be mounted to any side of a vehicle 104, or to one or more sides of a vehicle 104 (e.g., a front side, a rear side, a lateral side, a top side, or a bottom side of the vehicle). The mounting position of the plurality of radar modules 103-1, 103-2, and 103-3 may be determined based on driving conditions, type of vehicle, use cases, and the like.

The front side of the vehicle may be the side that is facing a general direction of travel of the vehicle 104, while a rear (or back) side may be the side that is not facing the general direction of travel of the vehicle 104. The lateral side may include a left side or a right side of the vehicle. In some embodiments, the vehicle 104 is configured to move or translate orthogonally to the lateral sides of the vehicle. In some cases, the plurality of radar modules 103-1, 103-2, and 103-3 may be mounted between two adjacent sides of the vehicle.

In some cases, each of the plurality of radar modules 103-1, 103-2, and 103-3 may be configured to be mounted in the same or different orientations. For example, one or more of the radar modules 103-1, 103-2, and 103-3 may be mounted on the same side of the vehicle and facing the exact same direction (e.g., straight ahead). In another example, the radar modules 103-1, 103-2, and 103-3 may be mounted on the same side of the vehicle but oriented in different directions (e.g., with some rotational offset between them).

The plurality of radar modules 103-1, 103-2, and 103-3 may be mounted to the vehicle 104 using a mounting bracket, which affixes the radar module to the vehicle. The plurality of radar modules may be mounted using a shared mounting bracket or using separate mounting brackets. In some cases, a subset of the plurality of radar modules may share a mounting bracket while the other radar modules have separate brackets. When a common bracket is used, the relative extrinsic (translation and orientation) of the affixed radar modules can be known precisely at time of assembly. Additionally, the relative extrinsics of the affixed radar modules change less over time and may be less sensitive to vibration, aging, and temperature effects. As such, the efficiency of combining data from the plurality of radar modules is improved, in some examples, through a strong mechanical coupling between the radar modules provided by mounting the radar modules using a common bracket. In some cases, using a common bracket may allow combining data from the plurality of radar modules using the nominal (designed) extrinsic, that is without having to estimate and correct for any inaccuracy, manufacturing variation, or drift in said extrinsic. In other embodiments, a simplified extrinsic calibration algorithm may be used, which for instance estimates a narrower range of extrinsic variations or runs less frequently, since the common bracket provides more robust extrinsics.

In some embodiments, the plurality of radar modules 103-1, 103-2, and 103-3 may be mounted using separate brackets. In such embodiments, each bracket is smaller, and the radar modules may be installed independently. In some embodiments, the extrinsics are estimated using a calibration algorithm prior to combining radar data from the plurality of radar modules. In some cases, algorithms to estimate the relative extrinsics and permit compensation of wider variations in the extrinsics are employed (see below for examples).

In some cases, the plurality of radar modules 103-1, 103-2, and 103-3 may be mounted with large spacing between them. Said spacing may consist of a horizontal, vertical, or depth spacing. A spacing may be 1, 2, 5, 10, 20, 25, 40, 50, or 100 cm or more, individually in each dimension.

The vehicle 104 may be any type of machine that transports people or cargo. Example vehicles include, but are not limited to, wagons, bicycles, motor vehicles, agricultural equipment, tractors, mining vehicles, railed vehicles, construction equipment, watercraft, amphibious vehicles, aircraft, spacecraft, and the like. The vehicle 104 may be operated by a living subject, such as an animal (e.g., a human). In some embodiments, the vehicle 104 may be unmanned, autonomous, or partially autonomous. The vehicle 104 may be stationary, moving, or capable of movement.

As illustrated in FIG. 2, the plurality of radar modules 103-1, 103-2, and 103-3 may be configured to transmit the first set of radar signals comprising a plurality of outgoing radar pulses 105-1, 105-2, and 105-3. The plurality of radar modules 103-1, 103-2, and 103-3 may be configured to receive a second set of radar signals comprising a plurality of incoming radar pulses 106-1, 106-2, and 106-3. The plurality of radar modules 103-1, 103-2, and 103-3 may be operatively coupled to and in communication with a processor 140. The plurality of radar modules 103-1, 103-2, and 103-3 may be configured to provide the second set of radar signals or the plurality of incoming radar pulses 106-1, 106-2, and 106-3 respectively received by each of the plurality of radar modules to the processor 140. In some embodiments, the processor 140 is configured to process the incoming radar pulses 106 received by the radar signals to determine a scene representation of the environment based on a number of corrected radar signals.

Figure 3A:
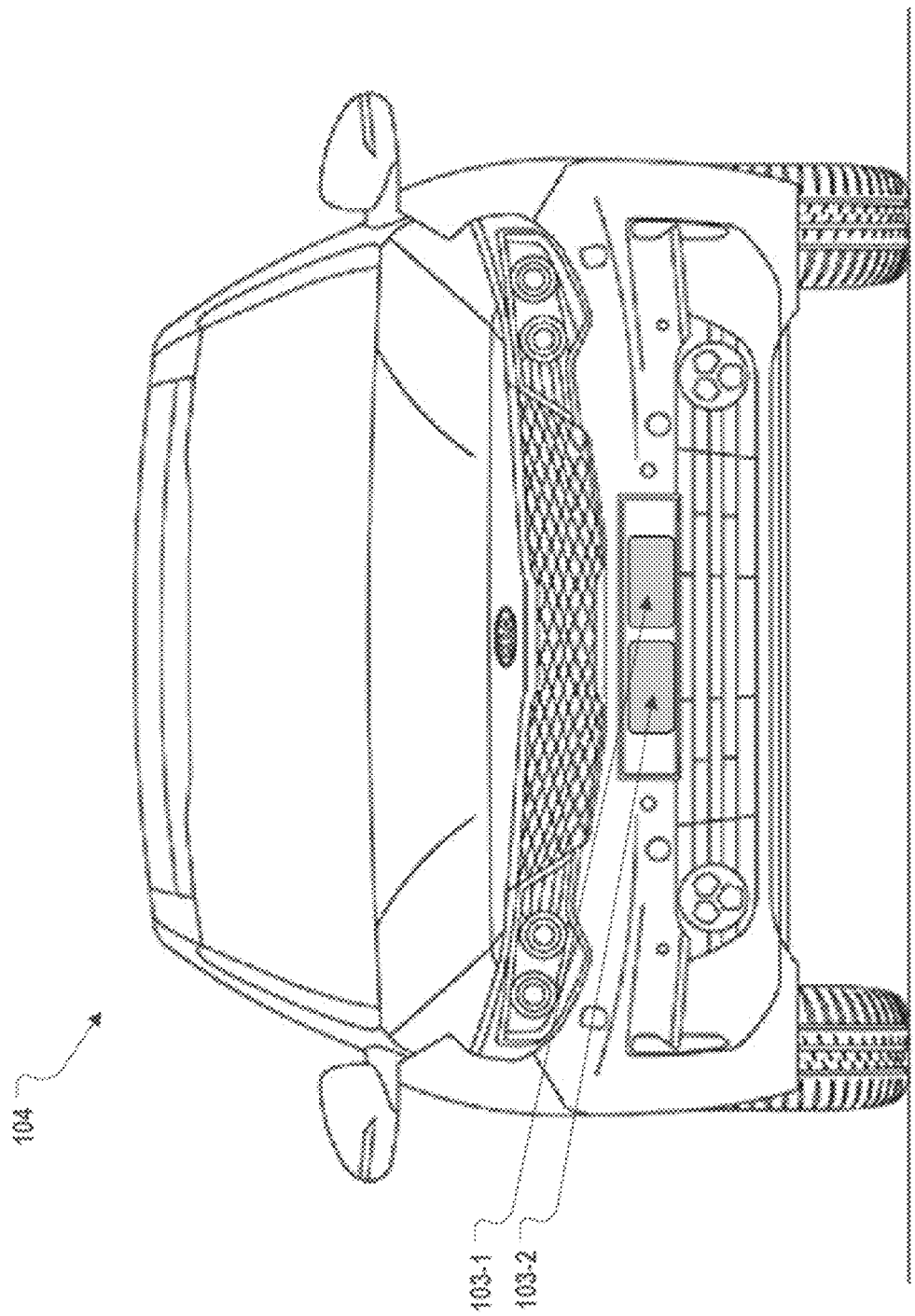
FIGS. 3A and 3B each depict an example mounting configuration of the plurality of radar modules.
Figure 3B:
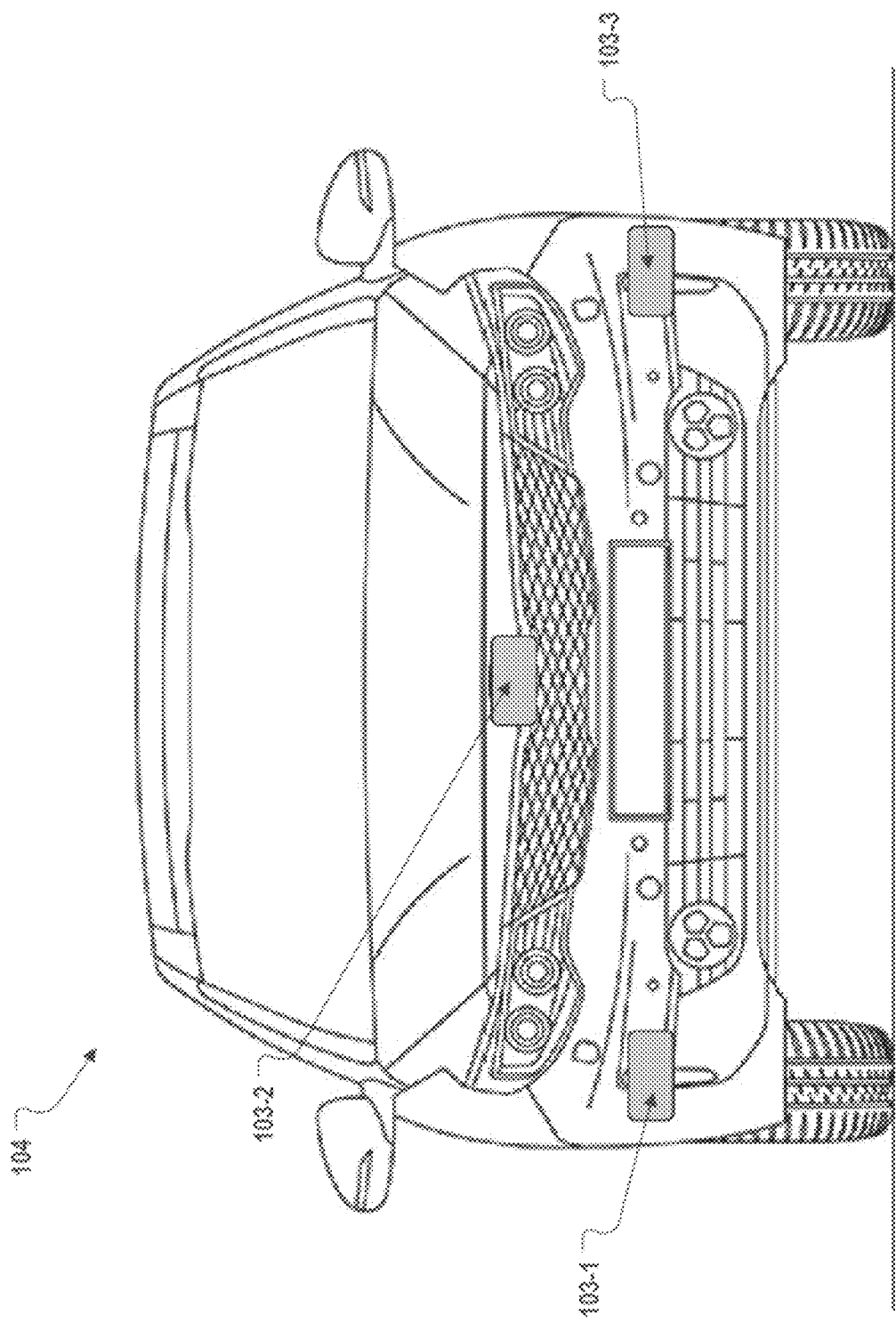

FIGS. 3A and 3B each depict an example mounting configuration of the plurality of radar modules 103-1, 103-2, and 103-3 on the vehicle 104. FIG. 3A depicts an example mounting configuration where the radar modules are collocated whereas FIG. 3B depicts an example mounting configuration where the radar modules are not collocated. In some embodiments, the radar modules 103 are mounted on a single common bracket. In some embodiments, at least one of the radar modules 103 has a different bracket than the others. In some embodiments, the radar modules 103 are mounted with different orientations. For example, in some embodiments, the radar modules 103 are mounted with arbitrary 3D offsets between them (e.g., horizontal, vertical, or depth) or with different fields of view.

Figure 6A:
FIGS. 6A and 6B each depict an example mounting radar module configuration.
Figure 6B:

In some embodiments, the radar modules 103 are mounted facing the same direction on the vehicle but may have different rotation around their forward-looking axis (x axis in AUTOSAR convention). This ensures that the radar modules have the same field of view, but different orientations with respect to one another. For example, one or more of the radars may be rotated by a roll of 180 degrees, 90 degrees, 45 degrees, or any other value. FIGS. 6A and 6B depicts an example of radar modules mounted with a roll of 180 degrees.

Figure 4:
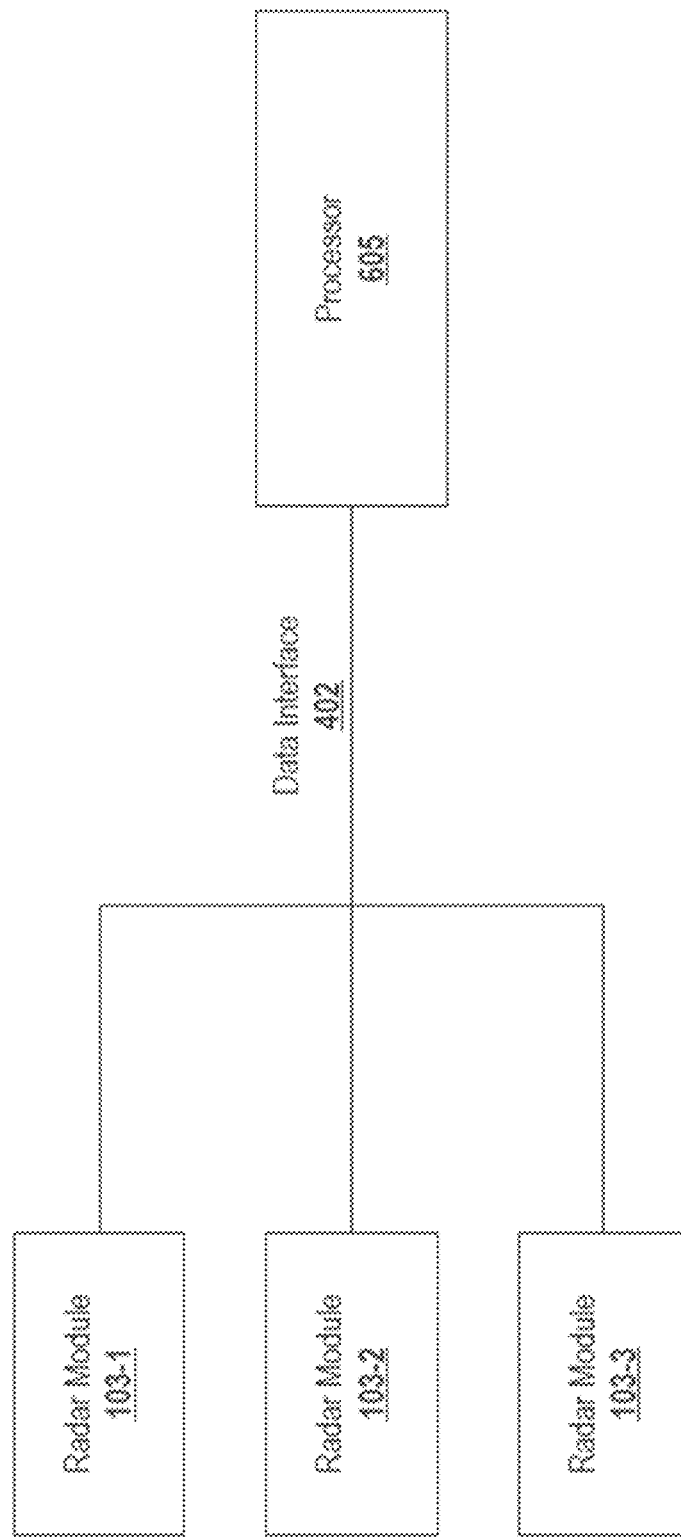
FIG. 4 depicts an example system that includes a plurality of radar modules each electronically coupled to a processing element via a data interface.

As described above, an example system includes a plurality of radar modules 103 (e.g., two or more) with data interfaces that connect back to a processing element (e.g., an electronic processor). FIG. 4 depicts an example system that includes a plurality of radar modules 103-1, 103-2, and 103-3 each electronically coupled to an electronic processor 705 (see FIG. 7) via a data interface 402. Example embodiments of the data interface 402 include Ethernet, automotive Ethernet, Flat Panel Display Link (FPD-Link), Gigabit Multimedia Serial Link (GMSL), Mobile Industry Processor Interface A-Physical (MIPI A-PHY), or Automotive Serdes Alliance (ASA) MotionLink. In some implementations, the radar modules 103 include one or more electrical interfaces that include hardware components such as plugs, sockets, and the like. The one or more electrical interfaces are used to send and receive electrical signals (e.g., to and from the electronic processor 705 and/or the other radar modules 103). In some implementations, the radar modules 103 (e.g., two of the radar modules) are connected via a cable that is attached via an electrical interface. In some implementations, the radar modules 103 are configured to provide a timing signal, a trigger, clock signal, and the like to one another via the cable. In some implementations, an electrical interface is configured as a data interface.

In some embodiments, each radar module 103 is configured to transmit a digitized radar signal over the data interface 402. In some embodiments, the electronic processor 705 is configured to process the received digitized radar signals with a signal processing algorithm(s). In some embodiments, some pre-processing is done by the radar module prior to sending the data over the interface. Pre-processing steps may include computing a Fourier transform, applying a window function, performing interpolation or extrapolation, applying a compression algorithm which reduces the data rate losslessly or lossily, applying calibration coefficients, zeroing out interference signals, filtering interference signals, performing detection of points or patches, or any other signal processing operation.

In some embodiments, the radar modules 103 share no synchronization signals. In some embodiments, trigger or reference clock signals are sent (e.g., using the data interface) as an additional protocol or capability of the data protocol. In some cases, Precision Time Protocol (PTP) over Ethernet may be used. In some cases, the backchannel as part of FPD-Link, GMSL, MIPI A-PHY, or ASA MotionLink may be employed. In another embodiment, a distinct reference clock signal or trigger signal is shared between radar modules 103 using one or more dedicated cables. The signals may originate from a common clock/time master. Alternatively, the signals may be generated by one radar module 103 and sent to the others.

In some embodiments, the shared clock signal provides a common frequency reference for the plurality of radar modules. The shared reference clock may be a sine wave, a square wave, or any other periodic signal at a frequency of 10, 20, 25, 40, 50, or 80 MHz or other similar frequency. The radar modules may use this reference frequency to each individually multiply up to higher internal frequency signals such as ADC sampling clocks, digital processing clocks, I/O clocks, or local oscillator (LO) signals. Using a shared clock signal ensures that all radar modules are frequency synchronous.

In some embodiments, a shared clock signal is not used. In such embodiments, each radar module may have an internal frequency reference such as a crystal oscillator or other frequency reference. In some cases, a first and a second radar module may have a frequency reference with the same nominal value (e.g., 40 MHz) but which may differ between the first and second radar module due to manufacturing variation, temperature, mechanical strain, or other factors. For example, the first radar module's reference may be 40 MHz-10 parts per million (ppm) and the second radar module's reference may be 40 MHz+13 ppm. In this case, the first and second radar modules have the same nominal frequencies but slightly differing actual frequencies of operation. In some embodiments, if a shared clock signal is not used, the frequency offset between radar modules may be estimated prior to combining radar data from the plurality of radar modules. In some embodiments, the local oscillator can be tuned to correct in hardware the estimated frequency offset.

In some embodiments, the shared trigger signal is designed to achieve an error of no more than a few nanoseconds between each radar module. The total error is a result of both systematic (e.g., cable length or routing mismatch) and random (e.g., jitter) effects. For instance, it could be desirable for the trigger error to be in the range of plus or minus 1, 2, 4, 8, 16, or 25 nanoseconds. In the case of an FMCW modulation, this would ensure that the outgoing pulses from active transmitters are overlapped in time and frequency and therefore that bistatic operation is possible.

In some embodiments, the shared trigger signal is designed to achieve an accuracy on the order of a microsecond. For example, the accuracy may be 1, 2, 4, 8, 10, or 15 microseconds. For an FMCW modulation, the shared trigger signal may be used to ensure that outgoing pulses from active transmitters are separated in time and frequency and therefore do not overlap. Moreover, the shared trigger signal prevents bistatic operation and separates each radar module's operation from all others. In particular, this type of operation may be used, for example, to prevent interference between radar modules.

In some embodiments, the intentional, systematic, or random parts of the trigger delay between the plurality of radar modules is estimated. For example, the presence of any un-estimated or uncompensated delay may prevent or corrupt the combining of radar data from the plurality of radar modules. As such, an estimation plus compensation process may be used to remove the effect of these trigger delays prior to radar data combining.

Figure 5:
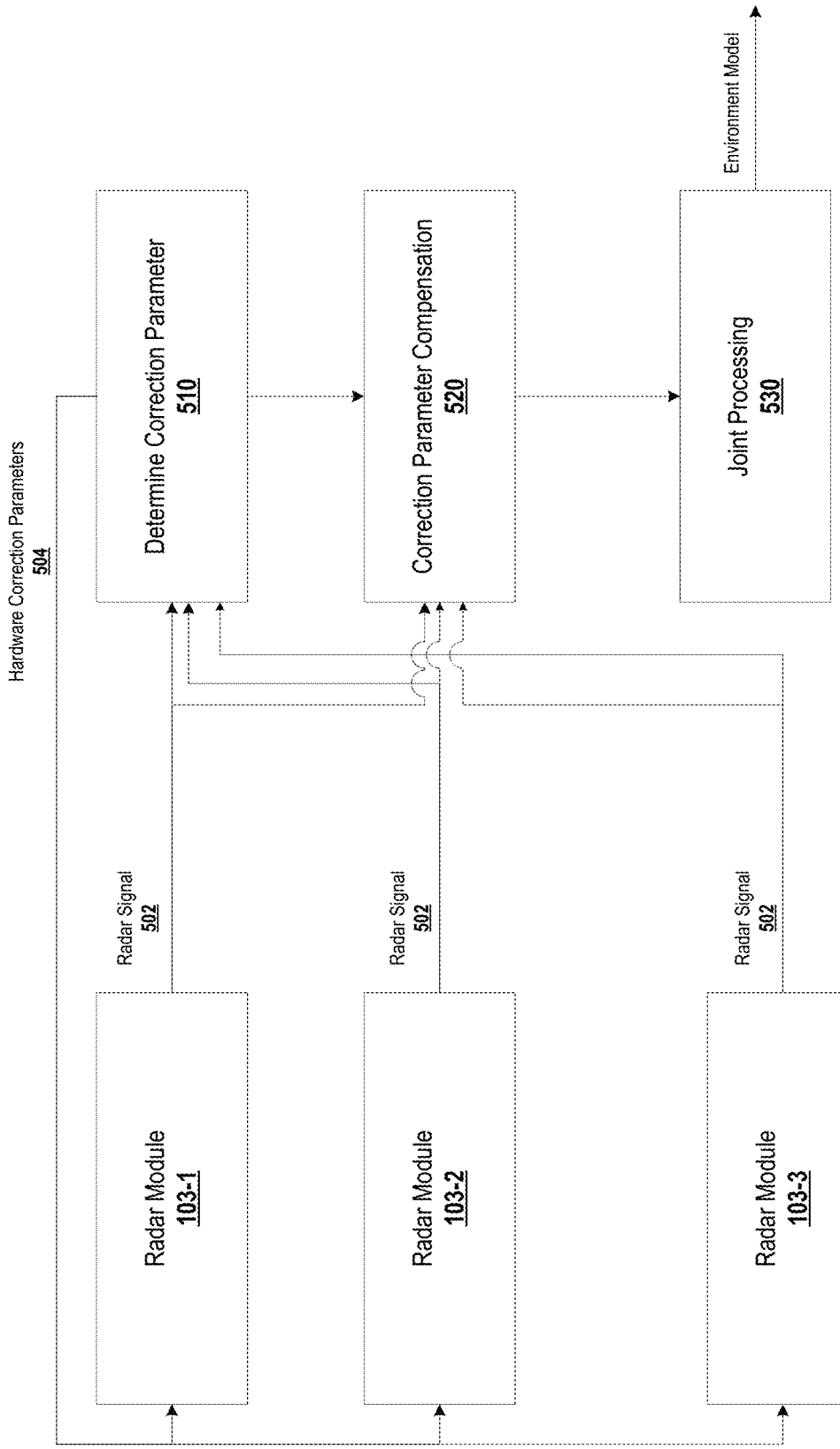
FIG. 5 depicts an example embodiment of a signal processing algorithm in accordance with some embodiments.

FIG. 5 depicts an example embodiment of the signal processing algorithm. As depicted, at step 510, the digitized radar signals 502 received from each of the radar modules (e.g., radar modules 103-1, 103-2, and 103-3) are compared to determine correction parameters. The correction parameters may include one or more of the following: difference in carrier frequency, intermediate frequency (IF), or baseband frequency; difference in FMCW ramp slope; difference in chirp or frame start time, difference in carrier, IF, or baseband phase; relative extrinsic between sensors; a phase noise sequence for one or more chirps; and relative intrinsic parameters (gain and phase of the RX or TX channel, at a single angle or for each target angle) for one or more antenna channels. As described variously above, the choice of which correction parameters to estimate and correct may be connected to the physical design, mounting, and synchronization of the plurality of radar modules. For example, the choice of mounting locations and bracket design may influence whether extrinsic parameters need to be estimated or not, and how precisely they must be estimated. As another example, the choice of whether or not to share a frequency reference signal may influence whether a frequency offset or FMCW ramp slope offset needs to be estimated or not.

In some embodiments, the correction parameters are estimated between some of the set of physical (monostatic) and virtual (bistatic) radars in the system. For example, in the depicted case with radar modules 103-1, 103-2, and 103-3, there may be up to three physical radars and six virtual radars. Each virtual radar transmits from a first module and receives on a second module. Correction parameters may be computed between two or more of the radars, whether physical or virtual.

Two virtual bistatic elements are described as being collocated when they have nominally identical distance to the target, wherein distance is computed as distance of the RX element to the target+distance of the TX element to the target. In some embodiments, some virtual bistatic elements are collocated using, for example, specific arrangement of the radar modules, or with a specific array geometry design of each of the array modules. All or a subset of the bistatic virtual elements formed by a pair of radar modules may be collocated. For example, the bistatic virtual arrays of a pair of two identical radar modules with the same orientation are collocated by geometrical construction. In another example, designing a radar module array by placing a TX element in the middle of two RX elements still allows to have collocated bistatic virtual elements between a pair of radar modules 103 even rotating one of them by 180 degrees around its forward-looking axis. In some embodiments, the same technique can be used by placing a RX element in the middle of two TX elements. Because collocated channels have the same distance to the target. Therefore, the virtual channels appear as if they occupied the same physical location, and their signals can be compared directly. The fact that the system has collocated bistatic virtual arrays or elements may be used to simplify the estimation of some correction parameters. In some embodiments, the virtual bistatic elements can be collocated. In some embodiments, none of the virtual bistatic elements are collocated, meaning that they all have unique distances to the target. The choice of whether to collocate virtual bistatic elements, and how many to do so, may be incorporated into the design and implementation of the correction parameter estimation algorithms.

In some embodiments, depicted in FIGS. 6A and 6B, the radar modules 103 may be rotated around their forward-looking axis by 180 degrees in order to use identical radar modules (in the sense of being the same part number) to drive the cost of the overall system down but having more flexibility in the resulting virtual antenna array of the whole system. In that case, as described above, the number of collocated elements results from the placement of the TX and RX elements on the radar modules 103 and the relations of symmetry between them. For example, having less collocated elements and thus more individual virtual elements to place can be used to make the resulting virtual array denser or larger, thus decreasing the angular ambiguity or increasing the angular resolution of the overall system. In another example with two identical radar modules, the rotation of one of the modules can be used to improve the resolution of the overall system in an orthogonal or any other direction to the displacement between the two radar modules. The rotation of 180 degrees allows the antenna of both radar modules to have the same polarization.

As described below, and in FIG. 5, it is desired to combine the corrected radar signals. In particular, the corrected radar signals are coherently combined. In some embodiments, in order to perform coherent combination, the correction parameters are estimated in a coherent fashion by preserving the target complex gain across monostatic or bistatic modules used in the system, which means that optimization problems formulated below maintain the target's complex gain consistent across said modules (parameter $c_k$ in the below parameter estimation problems). Generally, this design methodology may be applied to the parameter estimation problems described below. By imposing this constraint, phase relationships in range, Doppler, and angle are preserved and allow coherent combination of radar signals across modules.

In some embodiments, the correction parameters include a difference in chirp or frame start time between two radars. When the radar modules are being operated in multistatic mode, then a difference in start time may lead a physical and a virtual radar to measure different ranges to the same target. The order of magnitude of this time offset is generally in the range of 1-50 ns and generally does not have a nominal value as it occurs from hardware inaccuracies. In some embodiments, this start time offset can be estimated by selecting reference targets in the monostatic and bistatic signals separately, associating them to find correspondence to the same physical objects, and comparing the difference of the range measurement made in the monostatic and bistatic signals. The monostatic signals should provide the true range, while the bistatic range estimates are symmetrically offset from the true range by some range error. The range error may be used to estimate the time offset parameter using the relationship of range to time delay: $\Delta r = c*(\Delta t/2)$. In some embodiments, the start time offset can be estimated through correlating the monostatic and bistatic range spectrums or correlating multiple bistatic range spectrums. In some embodiments, the correlation can be performed on range-doppler spectrums, for example when using waveforms coupling these two dimensions. The peak in the correlation will be found at the value of the range offset, which can be used to estimate the time offset using the same equation above. Finally, in some embodiments, model fitting techniques or other parameter estimation techniques can be used to estimate this time offset, by formulating an optimization problem as a function of the unknown synchronization parameter and the unknown reference target ranges. A simplified example with two radar modules of a model fitting using only the bistatic signals would be solving the following minimization problem:

$$\min_{\{\forall k \in [0,K[,r_k,c_k,\varphi_k^{12},\varphi_k^{21}\},\Delta t} \sum_{k=0}^{K} \left\| z_k^{12} - c_k e^{\varphi_k^{12}} PSF(r_k - c*\Delta t/2) \right\|^2 + \left\| z_k^{21} - c_k e^{\varphi_k^{21}} PSF(r_k + c*\Delta t/2) \right\|^2$$

using K targets of unknown ranges $r_k$ and complex gains of the same amplitude $c_k$ and of phases $\varphi_k^{12}$ and $\varphi_k^{21}$, their corresponding bistatic range samples $z_k^{12}$ and $z_k^{21}$ (whole spectrum or only a neighborhood), and where PSF is the model of the range Point Spread Function for these samples. In some examples, these techniques are employed by using only the bistatic signals, or also the monostatic signals. In some examples, the bistatic virtual elements (bistatic VXs) are collocated, in others not: this is not necessary as the range/time offset that are measured on the targets are usually much bigger than the physical distance between bistatic VXs.

When the radar modules are being operated in a monostatic mode, then a (intentional) difference in start time may lead to motion of the target or ego-vehicle between physical radars. The order of magnitude of this time offset is generally in the range of 1-30 μs. In some embodiments, the difference in start time can be estimated by enforcing consistency of observations between the radar modules' signals subject to the constraint of the vehicle or target motion. To estimate the vehicle and target motion, in some embodiments, a first order approximation of the motion of targets (stationary and moving) in the scene can be used based on the radar Doppler measurement. The motion of the vehicle can also be measured with an external sensor (e.g., a Global Navigation Satellite System (GNSS), Inertial Measurement Unit (IMU), or wheel encoder sensor) or with radar odometry techniques. Once the target and vehicle velocities are estimated, consistency between observations between different radars can be enforced. For example, a target's range r and doppler D are related by r (t0+Δt)=r (t0)+D*Δt. Because one radar observes (r(t0+Δt), D) and the other radar observes (r(t0), D), the time offset Δt can be found by solving the above equation for the targets in the scene. In some embodiments, the difference in start time can simply be estimated based on a nominal value that is measured in the lab. In some embodiments, the start time difference is refined by jointly estimating it with the ego-vehicle motion, using radar odometry techniques.

In one embodiment, the correction parameters include a difference in carrier frequency, IF frequency, baseband frequency, or FMCW ramp slope. Such a difference might occur, for example, if no common frequency reference is used between radar modules and therefore each module has a separate and slightly varying frequency reference. In some cases, this difference in frequency reference is constant or approximately constant over the span of a single radar frame, for example when each module uses a different oscillator with a small constant error of their frequency from the nominal value. In some embodiments, the frequency offset is too small to create a range difference and instead leads to a range-dependent phase shift in the measured target phases, described by: $\Delta\varphi = \Delta f*(2*r/c)$. This equation may be solved to estimate the frequency offset $\Delta f$, averaging over all targets in the scene and taking care to handle phase wraps by increments of 2 pi. In some embodiments, model fitting techniques can be used to estimate this frequency offset, by formulating an optimization problem as a function of the unknown synchronization parameter and the unknown reference target Directions of Arrival (DOA), taking into account the range of each target to convert it to a phase offset between modules. Because the phase progression due to the angular locations of the targets must be consistent between modules, this constraint can be applied to solve for the unknown range-dependent phase correction parameter between radar modules. A simplified example with two radar modules would be solving the following minimization problem:

$$\min_{\{\forall k\in[0,K[,\theta_k,c_k\},\Delta f} \sum_{k=0}^{K} \|z_k^1 - c_k a_1(\theta_k)\|^2 + \|z_k^2 - e^{j\Delta f*2r_k/c} c_k a_2(\theta_k)\|^2$$

using K targets of known ranges $r_k$ and their corresponding VX channels data $z_k^1$ and $z_k^2$, and where $a_i(\theta_k)$ is the steering vector for the module $i \in \{1,2\}$ of a target at the unknown DOA $\theta_k$ and complex gain $c_k$ (common between all modules). In some cases, a transform may be applied to the signal and the model to improve the estimator performance. For example, the signal can be beamformed to specific locations. In other embodiments, the frequency offset is large enough to create an FMCW ramp slope offset, which may lead to a different scaling of the range spectrum between the two modules. In such cases, the frequency offset can be estimated by finding the correct scaling through correlation of the range spectrum between both radar modules. This can be achieved by resampling one of the bistatic range spectrum using the frequency-offset-dependent stretch/shrink factor and correlating it with the other range spectrum. In such examples, the correct value is found by maximizing peak value of the cross-correlation between one range spectrum and the resampled other range spectrum. The range deviation of targets in the scene between two modules can also be used directly.

In some embodiments the carrier frequency, IF frequency, baseband frequency, or FMCW ramp slope described above behave like a random walk. This effect is generally called phase noise, which degrades the doppler and the range response of the bistatic signals. The doppler response is degraded when the random walk evolution is noticeable from chirp to chirp, the range response is degraded when the random walk is noticeable within a chirp. Phase noise estimation lies in estimating this random walk, on the time scale at which it is relevant (only from chirp to chirp or inside a chirp). This can be achieved by extracting reference targets from the scene and comparing their range and doppler response from the ideal ones, considering any deviation as an impact of phase noise. In some embodiments, said comparison can be done by correlating or dividing the observed range or Doppler response of each reference target by the ideal range or Doppler point spread function. This comparison signal measures the spectral impact of just the phase noise process. The resulting comparison signal can be averaged over reference targets and RX receivers to improve the quality of the estimate and give a single estimate for the phase noise spectrum. This estimated phase noise spectrum can be used in a compensation process as described below. In some embodiments, said comparison can be done by correlating or dividing the observed range or Doppler response of each reference target in the bistatic spectrum by the corresponding range or Doppler response of the same reference target in the monostatic spectrum. Because the monostatic spectrum is nominally identical to the bistatic except for the phase noise impact, the resulting comparison signal represents an estimate of the phase noise process alone. The resulting comparison signal can be averaged over reference targets to improve the quality of the estimate and give a single estimate for the phase noise spectrum.

In some embodiments, the correction parameters include a difference in carrier, IF, or baseband phase. In bistatic operation mode, the physical radars should agree on the phase of the target, while all pairs of virtual radars would have a different symmetric phase offset of $\pm\Delta\varphi$. In some embodiments, model fitting techniques or other estimation techniques can be used to estimate this phase offset, by formulating an optimization problem as a function of the unknown synchronization parameter and the unknown DOA of reference targets. Because the VX channel phase progression of observed targets must be consistent between monostatic and bistatic signals, the optimization problem can be solved for the unknown parameter which meets this constraint. A simplified example with two radar modules in bistatic mode would be solving the following minimization problem:

$$\min_{\{\forall k\in[0,K[,\theta_k,c_k\},\Delta\varphi} \sum_{k=0}^{K} \|z_k^{11} - c_k a_{11}(\theta_k)\|^2 + \|z_k^{22} - c_k a_{22}(\theta_k)\|^2 +$$
$$\|z_k^{12} - e^{j\Delta\varphi} c_k a_{12}(\theta_k)\|^2 + \|z_k^{21} - e^{-j\Delta\varphi} c_k a_{21}(\theta_k)\|^2$$

using K targets and their corresponding monostatic VX channels data $z_k^{11}$ and $z_k^{22}$, and where $a_{ij}(\theta_k)$ with i, j $\in$ {1, 2} is the steering vector of the target at the unknown DOA $\theta_k$ of the corresponding monostatic or bistatic module scaled by a complex gain $c_k$ (common between all modules). In some cases, a transform may be applied to the signal and the model to improve the estimator performance. For example, the signal can be beamformed to specific locations. In some embodiments, only stationary targets are used, the input data $z_k$ of the minimization problem above is extended to several range and/or doppler bins around each target, and the ego-velocity of the radar system is jointly fitted with the parameters described above.

In some embodiments, some bistatic virtual elements (bistatic VXs) may be collocated and therefore the target phases between pairs of virtual radars can be subtracted to obtain the quantity $(\Delta\varphi - \Delta\varphi) = 2\Delta\varphi$ and averaged over reference targets. In other embodiments, the phase offset can be estimated by correlating the range spectrum of the collocated bistatic virtual elements. The phase of the peak of the correlation will correspond to the phase offset between the correlated radars. However, in these techniques, $\Delta\varphi$ can only be estimated up to a pi-ambiguity since $2*(\Delta\varphi+\pi) = 2\Delta\varphi[\mod 2\pi]$. In some embodiments, the pi-ambiguity may be resolved by using the same mathematical model for the unknown reference targets DOA and the phase offset, but in a much simpler form since only the $\Delta\varphi$ and $\Delta\varphi+2\pi$ cases needs to be compared ($\Delta\varphi$ being already obtained through correlation). In some embodiments, the pi-ambiguity may be resolved by computing a beam spectrum (e.g., by beamforming) for each individual pi-ambiguity hypothesis and comparing the output power for each hypothesis, selecting the correct hypothesis as the one that gives the largest. In some embodiments, when different channels have different virtual locations, we can interpolate all radar modules' signals to a common location, allowing the same techniques to be used for estimating the unknown phase offset as when virtual bistatic elements are collocated.

In one embodiment, the correction parameters include an extrinsic between radars. Radar modules may be mounted on a vehicle with intentionally different positions and orientation relative to one another. In addition, their relative position and orientation may change over time as a result of factors such as thermal expansion or contraction, vibration, material aging, or the like. Finally, assembly tolerances often result in varying and unknown exact radar extrinsics. These effects are exacerbated in the case that the radar modules are mounted using separate brackets. In the case of a virtual radar, its extrinsic is a function of the mounting position and orientation of both transmitting and receiving radar modules.

The systematic or assembly-derived portion of the extrinsic may be estimated during vehicle assembly. At the end of the assembly line, the vehicle and radar system may be briefly powered on and placed in front of known reference targets. The extrinsic estimation algorithm may use the known presence or position of the reference targets to compute the extrinsic correction, by comparing the position estimates of the reference targets between all radars. Because the target position should match between all 3 radars, the deviations in angle estimates and 3D position directly correspond to the extrinsic errors between radars.

The extrinsic of the radar modules may be estimated online while the vehicle is operating in an unknown environment (i.e., without reference targets). This can be achieved by jointly fitting the extrinsic of each radar and some parameters of the targets in the scene (range, doppler, azimuth, elevation). A simplified example with two radar modules using only VX channel data would be solving the following minimization problem:

$$\min_{\{\forall k \in [0,K[,\theta_k,c_k\},R,T} \sum_{k=0}^{K} \|z_k^1 - c_k a_1(\theta_k)\|^2 + \|z_k^2 - c_k a_2(\theta_k, R, T)\|^2$$

using K targets and their corresponding VX channels data $z_k^1$ and $z_k^2$, where $a_i(\theta_k)$ is the steering vector for the module $i \in \{1,2\}$ of a target at the unknown DOA $\theta_k$ and complex gain $c_k$ (common between all modules), and where R and T are the rotation and translation transform from the second module to the first. In some cases, this can be done jointly with radar odometry techniques or by using an external source of ego-vehicle motion information to allow use of several frames in the estimation process, after matching points from one frame to another, or to help constrain and refine the DOA estimates of stationary targets (through known techniques like Doppler Beam Sharpening). In the state of the art, different techniques have been described for doing extrinsic estimation. In some embodiments, the described system extends any of the above algorithms by estimating the extrinsics jointly with the target positions using the raw signals as in the minimization problems above. A key innovation over the above techniques is to maximize the coherency of the total signal, which is achieved by solving for one complex gain $c_k$ per target for all modules. Another key innovation is that, in the case of bistatic operation mode, the geometry of the bistatic arrays themselves depends on the extrinsics between the physical modules. The VX positions of bistatic module ij are indeed generally computed as $p_{VX}^{ij} = p_{TX}^i + R\, p_{RX}^j + T$. For example, in the bistatic case with two modules, such problem can be expressed:

$$\min_{\{\forall k \in [0,K[,\theta_k,c_k\},R,T} \sum_{k=0}^{K} \|z_k^{11} - c_k a_{11}(\theta_k, p_{TX}^1 + p_{RX}^1)\|^2 +$$

$$\|z_k^{12} - c_k a_{12}(\theta_k, p_{TX}^1 + R p_{RX}^2 + T)\|^2 + \|z_k^{21} - c_k a_{21}(\theta_k, p_{TX}^2 + R p_{RX}^1 + T)\|^2 +$$

$$\|z_k^{22} - c_k a_{22}(\theta_k, R(p_{TX}^2 + p_{RX}^2) + T)\|^2$$

In some cases, the radar modules are placed in front of one or more targets of known DOA, so that the extrinsics can be obtained using a similar model as one of the minimization problems above but with the targets DOA already fixed. In some cases, a transform may be applied to the signal and the model to improve the estimator performance. For example, the signal can be beamformed to specific locations. In some embodiments, only stationary targets are used, the input data $Z_k$ of the minimization problem above is extended to several range and/or doppler bins around each target, and the ego-velocity of the radar system is jointly fitted with the parameters described above.

In some embodiments, the correction parameters include a complex gain, or gain and phase, (called an antenna intrinsic) between TX and/or RX channels. The plurality of radar modules may be nominally identical or intentionally different in materials, design, and fabrication. Nevertheless, even if they are nominally identical, the precise gain and phase of each RX and TX will vary from module to module as a result of manufacturing variations, temperature, voltage, and the like. These deviations would corrupt angle estimation algorithms since such algorithms rely on precise phase measurements between RX or TX pairs to estimate angle of arrival. In some embodiments, the intrinsics of each radar module are estimated individually, while in other embodiments, the intrinsics are estimated on the whole system using all available signals (monostatic or bistatic). For a single module, the intrinsic parameters on each virtual channel can be decomposed between RX and TX contributions as $C=C_{TX}C_{RX}$. In some embodiments, the complete coupling matrix C between all VX is estimated. The intrinsics of the radar modules can be estimated online while the vehicle is operating in an unknown environment (i.e., without reference targets). This can be achieved by jointly fitting the intrinsic parameters of each radar and the angular parameters of targets in the scene. An example for a single module would be solving the following minimization problem:

$$\min_{\{\forall k \in [0,K[, \theta_k, c_k], \{\forall i,j\ c_{TX}^i, c_{RX}^j\}\}} \sum_{i=0}^{TX} \sum_{j=0}^{RX} \sum_{k=0}^{K} \|z_k^{ij} - c_k c_{TX}^i c_{RX}^j a(\theta_k)\|^2$$

using K targets and their corresponding VX channels data $z_k^{ij}$ (for transmitting element TX i and receiving element RX j), $c_{TX}^i$ and $c_{RX}^j$ are the intrinsic complex gains of each TX and RX antenna, and where $a(\theta_k)$ is the steering vector of a target at the unknown DOA $\theta_k$ and complex gain $c_k$. In some embodiments, in bistatic operating mode, the intrinsics parameters of the bistatic arrays can be obtained by combining the RX and the TX contributions of the radar modules involved. In such cases, the total number of intrinsics parameters is reduced to estimate only RX and TX contributions of the physical modules involved in the bistatic operation. For example, in the bistatic case with two modules, such problem can be expressed:

$$\min_{\theta_0, \ldots, \theta_K, \{c_{TX_1}^i, c_{RX_1}^j, c_{TX_2}^i, c_{RX_2}^j \forall i,j\}} \sum_{i=0}^{TX} \sum_{j=0}^{RX} \sum_{k=0}^{K}$$
$$\|z_k^{11,ij} - c_k c_{TX_1}^i c_{RX_1}^j a(\theta_k)\|^2 + \|z_k^{12,ij} - c_k c_{TX_1}^i c_{RX_2}^j a(\theta_k)\|^2 +$$
$$\|z_k^{21,ij} - c_k c_{TX_2}^i c_{RX_1}^j a(\theta_k)\|^2 + \|z_k^{22,ij} - c_k c_{TX_2}^i c_{RX_2}^j a(\theta_k)\|^2.$$

In some cases, the radar modules are placed in front of one or more targets of known DOA, so that the intrinsics can be obtained using a similar model as one of the minimization problems above but with the targets DOA already fixed. In some cases, a transform may be applied to the signal and the model to improve the estimator performance. For example, the signal can be beamformed to specific locations. In some embodiments, only stationary targets are used, the input data $z_k$ of the minimization problem above is extended to several range and/or doppler bins around each target, and the ego-velocity of the radar system is jointly fitted with the parameters described above. In order to reduce even more the number of parameters to fit, some constraints can be added on the intrinsics, such as constraining them to simply a global phase and gain offset for each module or to belong to the steering vector manifold of the individual module array or of the array with all modules.

In some embodiments, the correction parameters described above are estimated without specifically estimating target parameters but coherently reconstructing the radar spectrum (i.e., the spectrum of electromagnetic waves) or some patch of it across all radars. For example, the estimation problem can be expressed as minimizing the cost $\|Z-A(R, T, C, \Delta\varphi, \Delta t)\|^2$ where z is the radar data for multiple radar signal (monostatic and/or bistatic), $A(R, T, C, \Delta\varphi, \Delta t)$ is the forward model depending on correction parameters such as extrinsics, intrinsics, phase offset, time offset or any of the correction parameters mentioned above, and x is the reconstructed spectrum. The cost can be based on several kinds of norm or metrics comparing Ax and z and can be combined with several kinds of prior on the reconstructed spectrum x or on the correction parameters to estimate.

A similar problem can be expressed when operating in monostatic mode by only including the monostatic members of the cost expressed above. In some embodiments, the described system extends any of the state-of-the-art intrinsics calibration algorithms by estimating them jointly with the targets DOA using the raw signals as in the minimization problem above. As in the case of extrinsic estimation, a key innovation is to maximize the coherency of the signals by solving for one complex gain $c_k$ per target for all modules involved, monostatic and/or bistatic. In some cases, the radar modules are placed in front of one or more targets of known DOA, so that the gain and phase of each antenna can be obtained by dividing the channel values corresponding to these targets by the steering vector of their known DOAs and then decomposed according to TX and RX contributions. In some embodiments, the intrinsics parameters include multiple gain and phase estimates for each antenna, estimated separately for different DOAs. This may be necessary because the phase and gain of each antenna are DOA-dependent. They can be estimated for targets at various known DOAs, or the DOA dependency is approximated by a function whose parameters can then be estimated.

In some embodiments, the extrinsics and intrinsics are estimated in a coupled fashion by combining them together into a common cost function and optimization problem. In some embodiments, optimization is done alternatingly between different parameter sets (DOAs, extrinsics, intrinsics, ego-velocity) or subsets. For example, optimization may alternate between extrinsic and intrinsic parameters. In another example, optimization may alternate between one set of intrinsic parameters and a different set of intrinsic parameters.

In some embodiments, the correction parameters may include a sidelobe pattern (also known as a point spread function in angle). A beamformer response may be computed for the antenna geometry of the plurality of radar modules, using the steering vectors based on the ideal placement and response of the transmit and receive antennas. A sidelobe pattern may include the amplitude and phase of the beamformed array response as a function of azimuth or elevation angle. The true sidelobe pattern may differ from the ideal sidelobe pattern as a result of manufacturing variations, temperature effects, phase and gain imbalance of the antenna elements, antenna coupling, or other effects. The sidelobe pattern may be estimated by identifying reference targets in the environment which are widely separated from other targets. Their beamformer response can be measured and compared with the ideal beamformer, and deviations may be used to update the sidelobe pattern estimate.

In some embodiments, one or more of the above-described correction parameters may be estimated jointly. A signal model can be described which incorporates one or more of the above parameters into a common model. Then, a parametric estimation technique may be applied to jointly estimate said correction parameters across a range of common targets.

In some embodiments, some correction parameters are estimated during the manufacturing or assembly of the radar module or vehicle. In other embodiments, some correction parameters are estimated upon radar and processor boot each time that they are started. In still other embodiments, some correction parameters are estimated online while the radar and vehicle are being operated. In one such embodiment, the estimation is performed using chirps or pulses which have different properties than the majority of the chirps or pulses. In another embodiment, the estimation is performed by identifying reference targets in the scene, which are observed by more than one of the radar modules, and comparing the signal received from that target by each radar module. In another embodiment, the estimation is performed by comparing the spectra of the received signal from each radar module. In another embodiment, the estimation is performed using a signal propagation which interacts with a feature of the ego-vehicle. In another embodiment, the estimation is performed using a special feature of the scene, such as the condition that the ego-vehicle is completely stationary or such as the condition that at least one moving target is observed. In another embodiment, the estimation is performed using the signal received from multiple consecutive frames from each radar module. In some embodiments, some correction parameters are estimated frame by frame (e.g., with a sliding window of frame/chirps). In some embodiments, correction parameters are refined over time (e.g., over a finite or infinite number of cycles).

At step 520, the correction parameters are applied to the digitized radar signal 502 from each radar. In some embodiments, the applied correction parameters include a time delay. A time correction may be applied as a convolution in time (with a shifted delta function or interpolation kernel) or as a multiplication in the frequency domain (with the frequency transform of the interpolation kernel). In some embodiments, the applied correction parameters include a frequency shift. A frequency shift may be applied as a multiplication in time (with a complex exponential of the appropriate frequency) or as a convolution in the frequency domain (with the frequency transform of the appropriate complex exponential). In some embodiments, the applied correction parameters include a phase noise sequence. Phase noise compensation may be applied by multiplying each digitized radar signal by a correction sequence of the same length. In some embodiments, the applied correction parameters include an extrinsic between radars. An extrinsic compensation may be applied by choosing one radar to be the reference which remains uncompensated. The remaining radars have their extrinsics aligned with the reference radar by translating and rotating their antenna positions or their estimated target locations through a rotation matrix and translation vector. In some embodiments, the applied correction parameters include an intrinsic between channels where, for example, one transmit/receive pair is selected as a reference, and correction gain and phase parameters are scaled to maintain the reference pair at unity. The correction parameter may be applied by adjusting each demodulated MIMO receive channel by the appropriate gain and phase scaling factor for that particular transmit/receive pair. In an alternative embodiment, the intrinsic calibration may be separated into RX and TX components and applied before and after MIMO demodulation, respectively.

In some embodiments, multiple correction parameters are applied separately or jointly. In some embodiments, multiple correction parameters can be combined into a single correction process. For example, a time shift and frequency shift may be combined into a single operation by combining the interpolation kernel for the time shift with the complex exponential for the frequency shift. In another example, a frequency shift and a phase noise compensation may be combined into a single operation by combining the frequency shift exponential with the phase noise sequence into a single correction signal that is applied through pointwise multiplication with the digitized radar signal.

In some embodiments, one or more radars are corrected. The corrected radar signals may be from physical (monostatic) radars or from virtual (bistatic) radars. The reference radar may be a physical or a virtual radar. In some embodiments, some radars are left uncorrected or partially corrected relative to the rest of the plurality of radars.

In some embodiments, some hardware correction parameters 504 can be fed back to the radar modules 103-*n* (e.g., the hardware) as shown in FIG. 5. For example, when a time delay is observed with a constant mean through several frames, the correction parameter can be fed back to a hardware delay element which delays the trigger signal to a radar module. In some embodiments, this delay can be done through a standalone circuit or integrated circuit (IC), while in other embodiments, it can be done through configuring a more complex IC such as an Ethernet PHY.

In some embodiments, the correction parameter may be a frequency or phase offset which is fed back to a clock generator or clock adjustment circuit in the radar module. The clock circuit may be a PLL, oscillator, jitter cleaner, or clock multiplier/divider circuit. In some embodiments, the correction parameter is used to tune the clock circuit's frequency or phase output.

In some embodiments, the correction parameter may be fed back to the radar chip to change the modulation waveform. The correction parameter may represent a time measurement, a frequency measurement, or a phase measurement. In some embodiments, this correction parameter may be used to adjust radar waveform parameters which may include a center frequency, a ramp slope, a ramp start time, a sampling start time, a transmit phase, a per-chirp phase shift, a sampling frequency, a transmitter start time, or any other radar waveform parameter In some embodiments, the correction parameter may be an intrinsic gain or phase and may be fed back to the radar chip. In some embodiments, the radar chip may apply a gain or phase correction to the radar signal prior to transmission. In some embodiments, the radar chip may apply a gain or phase correction to the received radar signal prior to sending it to the central processor.

In some embodiments, this correction in hardware from correction parameters estimated from the radar signal can be done in a loop which runs continuously during radar operation. In some embodiments, the correction in hardware may be triggered from time to time based on some event or a monitoring procedure. In some embodiments, the hardware correction may be performed, through an initial startup calibration phase.

At step 530, the corrected radar signals are combined to generate a single representation of the environment wherein each detected point or target has properties that are estimated from the radars' signals 502. In some embodiments, the signal combining may include performing joint angle processing on the corrected radars. The correction process aligns the range, Doppler, and antenna channel dimensions as accurately as possible or as necessary for the application. In some cases, combined processing computes a single angle estimate for each target with the aligned data and antenna channels.

In some embodiments, combined angle processing is performed by computing a beamformer using corrected signals from two or more radars (physical or virtual). For example, when each radar module has N demodulated receive antenna channels and two radar modules are beamformed together, 2*N input channels are used for the beamformer. Similarly, when two physical radars and two virtual radars are beamformed together, the beamformer has 4*N input channels.

Because the overall multi-module array has a larger angular aperture, the beamformer may need to be computed with a very fine output resolution. In some cases, the beamformer resolution may be 0.1, 0.2, 0.25, 0.3, or 0.5 degrees, or any number between 0.1 and 2.0 degrees. In some embodiments, the beamformer may be an azimuth beamformer, elevation beamformer, or 2D beamformer.

In some embodiments, joint angular processing may require resolving substantial ambiguities or grating lobes in the beamformer spectrum. When the plurality of radar modules are separated with large gaps between them, the resulting beamformer spectrum may have substantial ambiguities. In some cases, ambiguities can be resolved by designing the antenna geometry to have enough non-uniform elements that the grating lobes have differing amplitudes. The main lobe can then be identified using a simple maximum condition, finding the strongest peak in the beamformer spectrum. In some cases, the ambiguities can be resolved by a coarse-fine method, where a small, dense beamformer first identifies a narrow search region and then the sparse high-resolution beamformer is used to enhance resolution only within that search region, using the resulting maximum to identify the highly resolved location of the target. In some cases, ambiguities can be resolved by pre-computing a lookup table showing which angles have similar responses. The most likely location of the main lobe can then be identified by evaluating a cost metric over this lookup table. The cost metric could use non-uniformities in the antenna geometry to differentiate between grating lobes. In some embodiments, an estimated sidelobe pattern may be used to identify and resolve angular ambiguities.

In some cases, the grating lobes of one target may be hiding another target present in the same angular region. In some embodiments, joint angular processing may involve using model-fitting techniques to estimate the targets' DOA jointly. In some embodiments, joint angular processing may involve applying iterative methods to estimate the most dominant target first, subtracting its signal (totally or partially), and repeating the procedure with the next dominant target (known, for example, as CLEAN algorithms). The most dominant target may be estimated using the signal from multiple modules, thereby combining the information, and the residual signal may be computed by subtracting its signal from one or more modules' signals. In some embodiments, joint angular processing may involve using interpolation or extrapolation techniques to fill the gap between the modules with the expected signal of certain parts of the beamforming spectrum, consequently canceling their grating lobes. The interpolation or extrapolation algorithm may reconstruct the signal at an interpolated or extrapolated antenna location, using the signals which were measured at a different antenna location. Then, both measured and interpolated or extrapolated antenna measurements may be processed together through a beamforming or model fitting algorithm.

In some embodiments, joint angular processing may involve reconstructing an angle spectrum using compressed sensing techniques. Compressed sensing techniques use a sparsity prior to reconstruct an estimate of the true spectrum. The output of the compressed sensing technique may be an angle spectrum which is further processed through other options, for example including thresholding, detection, or target parameter estimation.

In some embodiments, combined parameters estimation may be performed by fitting a single parametric model using data from two or more corrected radars (physical or virtual). The parametric model describes how the signal at each demodulated receive channel depends on one or more targets' RCS and range r, Doppler D, azimuth $\varphi$ and elevation $\theta$. The model fitting estimates these target parameters using the observed data from the physical or virtual radars. These parameters can be estimated separately or jointly, with any combination. The radar combining results in more constraints and observations to impose on the parametric estimation. For instance, when if 2 physical and 2 virtual radars are used to estimate the same model parameters, then 4*N constraints are available compared to a single physical radar. Additionally, the constraints may be more diverse since the physical and virtual radars carry complementary information about the target. The diversity of observations could improve the accuracy of the parameter estimation. Parameter estimation could be solved, for example, by maximum likelihood estimation (MLE).

In some embodiments, radar data is combined by performing combined detection across two or more corrected radars. In some cases, detection may be performed after combined angle processing as described above. For instance, after a joint beamformer is computed, combined detection can be performed by identifying peaks in the beamformer spectrum as the target detections. In some cases, detection may be performed directly on the range-Doppler spectrum prior to angle processing. Combined detection can be used by using the range-Doppler spectra from two or more radar modules out of the plurality of radar modules. In some cases, the range-Doppler spectra from the plurality of radar modules can be summed in absolute magnitude and combined detections can be associated with peaks in the resulting incoherent signals spectrum.

In some embodiments, joint processing may also include solving for multipath scenarios when, for example, a signal is not only following a direct path from the transmitters to the targets and a direct path from the target to the receiver but also may bounce on/off other surfaces or targets. For instance, a common multipath that can be measured by the described system follows the (emitted, transmitted or both) signal that bounces on the ground.

In some embodiments, the joint processing results in computing a joint environment model. In some cases, a joint environment model is a common representation of the environment which encompasses the information measured by all the radar modules which are used in the joint processing. In some cases, a joint environment model includes a single point cloud with resolution and accuracy performance that reflects the plurality of radar modules used to compute it. For example, when two radar modules are jointly combined to compute a single point cloud, the angular resolution and accuracy of this combined point cloud reflects the full aperture formed by both radar modules. In some cases, the joint environment model is an occupancy grid.

Computer Systems

Figure 7:
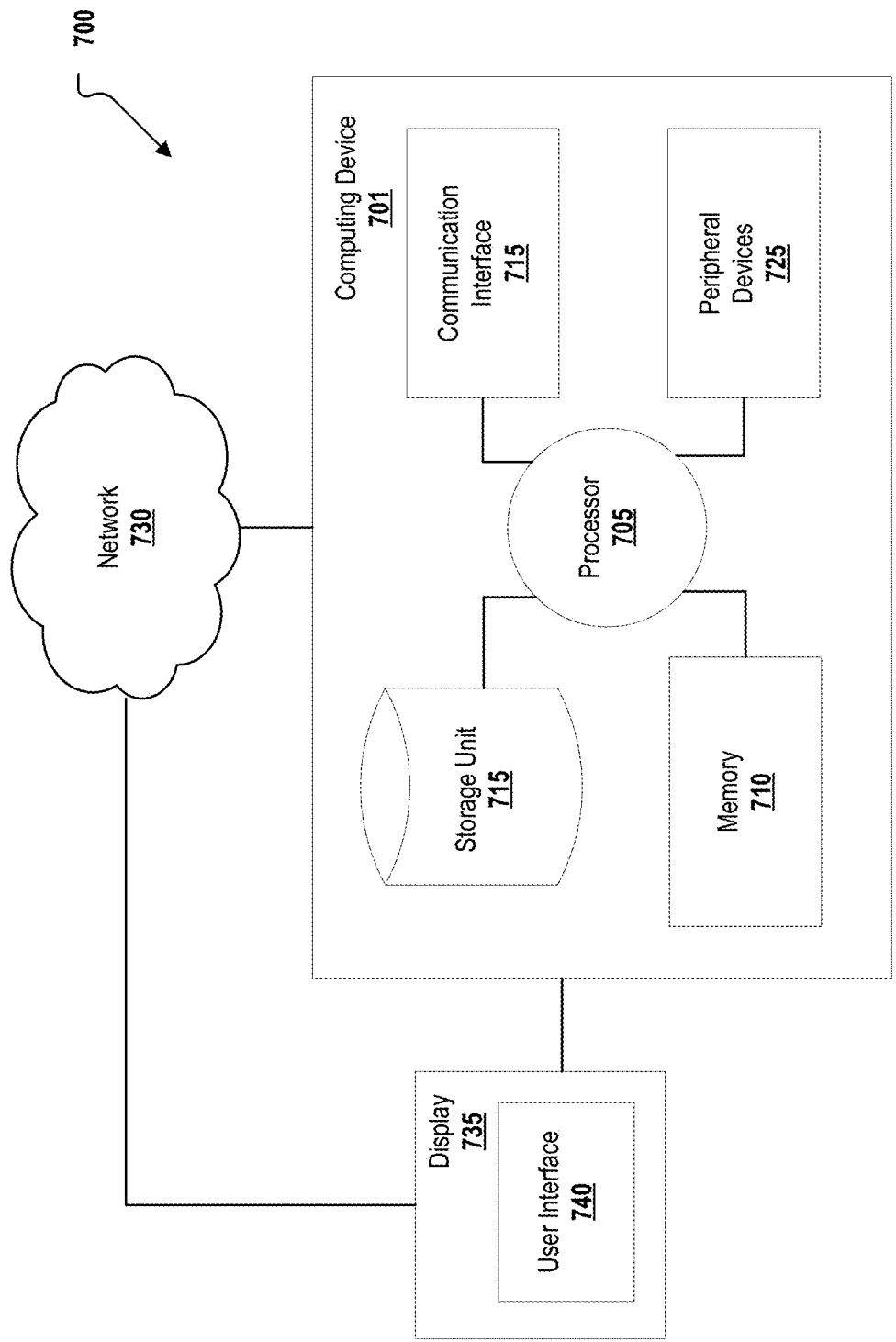
FIG. 7 depicts a non-limiting exemplary computer system that can be programmed or otherwise configured to implement methods or systems of the present disclosure.

Another aspect of the present disclosure provides computer systems that are programmed or otherwise configured to implement methods of the disclosure. FIG. 7 depicts a computer system 701 that is programmed or otherwise configured to implement platforms, systems, media, and methods of the present disclosure. For example, the computer system 701 can be programmed or otherwise configured to process radar data. The computer system 701 can be an electronic device of a user or a computer system that is remotely located with respect to the electronic device. The electronic device can be a mobile electronic device.

The computer system 701 includes a computing device 702. The computing device 702 includes a processor (also central processing unit "CPU," "computer processor," "processing element," and "electronic processor" herein) 705, which can be a single core or multi core processor, or a plurality of processors for parallel processing. The computing device 702 also includes memory 710 (e.g., random-access memory, read-only memory, flash memory) or a memory location, electronic storage unit 715 (e.g., hard disk), communication interface 720 (e.g., network adapter) for communicating with one or more other systems, and peripheral devices 725, such as cache, other memory, data storage or electronic display adapters.

The memory 710, storage unit 715, interface 720 and peripheral devices 725 are in communication with the electronic processor 705 through a communication bus (solid lines), such as a motherboard. The storage unit 715 can be a data storage unit (or data repository) for storing data. The computing device 702 can be operatively coupled to a computer network ("network") 730 with the aid of the communication interface 720.

The network 730 can be the Internet, an internet or extranet, or an intranet or extranet that is in communication with the Internet. The network 730 in some cases is a telecommunication or data network. The network 730 can include one or more computer servers, which can enable distributed computing, such as cloud computing. The network 730, in some cases with the aid of the computing device 702, can implement a peer-to-peer network, which may enable devices coupled to the computer system 701 to behave as a client or a server.

The electronic processor 705 can execute a sequence of machine-readable instructions, which can be embodied in a program or software. The instructions may be stored in a memory location, such as the memory 710. The instructions can be directed to the electronic processor 705, which can subsequently program or otherwise configure the electronic processor 705 to implement methods of the present disclosure. Examples of operations performed by the electronic processor 705 can include fetch, decode, execute, and write-back. The electronic processor 705 may include one or more digital signal processors (DSPs), application-specific integrated circuits (ASICs), CPUs, graphics processing units (GPUs), cryptoprocessors (specialized processors that execute cryptographic algorithms within hardware), server processors, hardware accelerators, or any other suitable processing devices. The electronic processor 705 can be part of a circuit, such as an integrated circuit. One or more other components of the computing device 702 can be included in the circuit. In some cases, the circuit is an application specific integrated circuit (ASIC) or a Field-programmable gate array (FPGA). In some embodiments, the electronic processor 705 is a system on a chip (SoC), a microcontroller, a dedicated accelerator, or a co-processor.

The storage unit 715 can store files, such as drivers, libraries, and saved programs. The storage unit 715 can store user data, e.g., user preferences and user programs. The computing device 702 in some cases can include one or more additional data storage units that are external to the computing device 702, such as located on a remote server that is in communication with the computing device 702 through an intranet or the Internet.

The computing device 702 can communicate with one or more remote computer systems through the network 730. For instance, the computing device 702 can communicate with a remote computer system of a user (e.g., an end user, a consumer, a driver, a vehicle operator, and the like). Examples of remote computer systems include personal computers (e.g., portable PC), slate or tablet PCs (e.g., Apple® iPad, Samsung® Galaxy Tab), telephones, Smart phones (e.g., Apple® iphone, Android-enabled device, Blackberry®), or personal digital assistants. The user can access the computing device 702 via the network 730.

Methods as described herein can be implemented by way of machine (e.g., computer processor) executable code stored on an electronic storage location of the computer system 701, such as, for example, on the memory 710 or electronic storage unit 715. The machine executable or machine-readable code can be provided in the form of software. During use, the code can be executed by the electronic processor 705. In some cases, the code can be retrieved from the storage unit 715 and stored on the memory 710 for ready access by the electronic processor 705. In some situations, the electronic storage unit 715 can be precluded, and machine-executable instructions are stored on memory 710. The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s)

or the like, such as may be used to implement the databases, and the like. shown in the drawings. Volatile storage media include dynamic memory, such as a main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The computing device 702 can include or be in communication with an electronic display 735 that comprises a UI 740 for providing, for example, a portal for monitoring one or more objects, obstacles, or targets detected by the radar system. In some cases, the portal may be used to render, view, monitor, or manipulate one or more occupancy grid maps generated by the processor or the plurality of radar modules. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the electronic processor 705. For example, the algorithm may be configured to execute the process 700 described below.

Example Process

Figure 8:
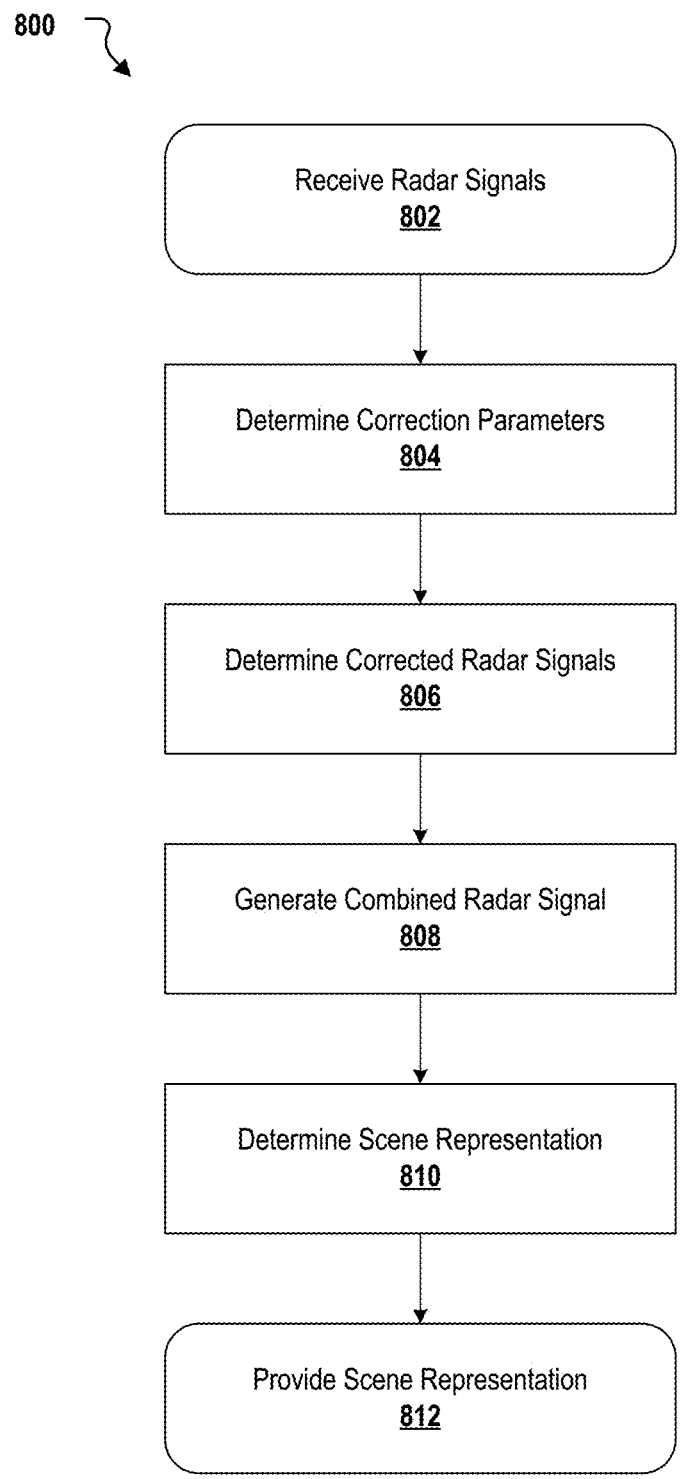
FIG. 8 depict flowcharts of a non-limiting exemplary process that can be implemented by embodiments of the present disclosure.

FIG. 8 depicts a flowchart of an example process 800 that can be implemented by embodiments of the present disclosure. The example process 800 can be implemented by the components of the described radar signals processing system such as described above in FIGS. 1-7. The example process 800 generally shows in more detail how a scene representation of an environment is determined by processing incoming radar signals.

For clarity of presentation, the description that follows generally describes the example process 800 in the context of FIGS. 1-7. However, it will be understood that the process 800 may be performed, for example, by any other suitable system, environment, software, and hardware, or a combination of systems, environments, software, and hardware as appropriate. In some embodiments, various operations of the process 800 can be run in parallel, in combination, in loops, or in any order.

At 802, a first digitized radar signal and a second digitized radar signal are received. The first digitized radar signal includes a first indication of objects in an environment. The second digitized radar signal includes a second indication of objects in the environment. In some embodiments, the radar signals are received via a data interface communicably coupled to a first radar module and a second radar module. In some embodiments, the first radar module is configured to provide, via the data interface, the first digitized radar signal. In some embodiments, the first radar module and the second radar module are each configured to provide, via the data interface, a timing signal, a trigger, or a clock signal, as an additional protocol or capability of a data protocol. In some embodiments, the first radar module and the second radar module do not share a timing signal or a trigger.

In some embodiments, the first radar module and the second radar module share a timing signal or a trigger. In some embodiments, the first radar module and the second radar module are communicably coupled via a cable. In some embodiments, the timing signal or the trigger is shared between the first radar module and the second radar module via the cable. In some embodiments, the shared trigger is precise to within 1 ns, 4 ns, or 8 ns between the first radar module and the second radar module.

In some embodiments, the first radar module and the second radar module share a clock signal. In some embodiments, the first radar module and the second radar module are communicably coupled via a cable. In some embodiments, the clock signal is shared between the first radar module and the second radar module via the cable. In some embodiments, the clock signal originates from a common clock or a time master. In some embodiments, the clock signal is generated by the first radar module and provided to the second radar module. In some embodiments, the clock signal is 40 MHz, 80 Mhz, or 1 GHz.

From 802, the process 800 proceeds to 804 where the first digitized radar signal and the second digitized radar signal are processed to determine a set of correction parameters. In some embodiments, the set of correction parameters include difference in FMCW ramp slope; difference in chirp or frame start time, difference in carrier, IF, or baseband phase; a relative extrinsic between sensors; a phase noise sequence for one or more chirps; or relative intrinsic parameters for each antenna channel. In some embodiments, the set of correction parameters are estimated using a model fitting approach by solving an optimization problem describing the first digitized radar signal and the second digitized radar signal as a function of the correction parameter. In some embodiments, the optimization problem uses common targets in the scene to determine the set of correction parameters between the first digitized radar signal and the second digitized radar signal.

In some embodiments, the first radar module and the second radar module are mounted on a common bracket. In some embodiments, the first radar module and the second radar module are mounted on separate brackets. In some embodiments, the first radar module and the second radar module are mounted with different orientations, with arbitrary three-dimensional offsets between them, or with different fields of view. In some embodiments, the first radar module and the second radar module are mounted to a vehicle. In some embodiments, the first radar module is corner-facing, and the second radar module is front-facing. In some embodiments, the first radar module is rear corner-facing, and the second radar module is rear-facing radar. In some embodiments, the first radar module and the second radar module are both front-facing or both rear-facing. In some embodiments, the first radar module and the second radar module are modulated with a time-MIMO configuration. In some embodiments, the first radar module and the second radar module are modulated with a code-MIMO configuration.

From 804, the process 800 proceeds to 806 where a first corrected radar signal is determined by applying the set of correction parameters to the first digitized radar signal and where a second corrected radar signal is determined by applying the set of correction parameters to the second digitized radar signal. In some embodiments, the first corrected radar signal and the second corrected radar signal are each determined by applying the set of correction parameters to the first digitized radar signal or the second digitized radar signal respectively.

From 806, the process 800 proceeds to 808 where the first corrected radar signal and the second corrected radar signal are combined into a combined radar signal. In some embodiments, the first corrected radar signal and the second corrected radar signal are combined into the combined radar signal by computing a joint beamformer over the first and second corrected radar signals.

In some embodiments, the first corrected radar signal and the second corrected radar signal are combined into the combined radar signal by fitting a parametric target model jointly to the first corrected radar signal and second corrected radar signal to generate a jointly estimated set of target parameters.

In some embodiments, the first corrected radar signal and the second corrected radar signal are combined into the combined radar signal by performing target detection on the jointly beamformed signal spectrum.

In some embodiments, the first corrected radar signal and the second corrected radar signal are combined into the combined radar signal by incoherently summing the first corrected radar signal and the second corrected radar signal to generate an incoherently summed signal and performing target detection in the incoherently summed signal.

From 808, the process 800 proceeds to 810 where a scene representation of the environment is determined based on the combined radar signal. In some embodiments, determining the scene representation of the environment includes determining one or more properties of one or more targets in the environment. In some embodiments, one or more properties include an azimuth angle or elevation angle of the one or more targets.

In some embodiments, the scene representation of the environment includes one or more of the following: a target list, an object list, a detection list, a 2D point cloud, a 3D point cloud, a point cloud with additional metadata such as radial velocity or time, a list of object bounding boxes, an occupancy grid, a tracking system, a free space map, a drivable area map, a range-Doppler spectrum, a shadow map, an occlusion map, a cluster of points, or a beam spectrum.

From 810, the process 800 proceeds to 812 where the scene representation of the environment is provided to an autonomous driving system.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

As described above, machine learning algorithms are employed herein to build a model to determine a set of output predictions for the environment. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modeling where relationships between variables are determined and weighted. In some embodiments, the machine learning algorithms employ regression modeling, wherein relationships between predictor variables and dependent variables are determined and weighted.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations, or equivalents. It is intended that the following claims define the scope of the disclosure and that methods and structures within the scope of these claims and their equivalents be covered thereby.

EXAMPLES

The following paragraphs provide various examples of the embodiments disclosed herein.

Clause 1. A computer-implemented method for processing radar signals, the method being executed by an electronic processor and comprising: receiving, from a first radar module, a first digitized radar signal of an environment; receiving, from a second radar module, a second digitized radar signal of the environment; processing the first digitized radar signal and the second digitized radar signal to determine a set of correction parameters; determining a first corrected radar signal by applying the set of correction parameters to the first digitized radar signal; determining a second corrected radar signal by applying the set of correction parameters to the second digitized radar signal; combining the first corrected radar signal and the second corrected radar signal into a combined radar signal; determining a scene representation of the environment based on the combined radar signal; and providing the scene representation of the environment to an autonomous driving system.

Clause 2. The method of clause 1, wherein the first radar module and the second radar module are configured to receive, via a first data interface and a second data interface respectively, a timing signal or a trigger as an additional protocol or a capability of a data protocol.

Clause 3. The method of clause 2, wherein the trigger is precise to within a value between 1ns and 50 ns between the first radar module and the second radar module.

Clause 4. The method of clause 2, wherein the first radar module and the second radar module are communicably coupled via a cable, and the first radar module is further configured to: generate the timing signal or the trigger; and provide the timing signal or the trigger to the second radar module via the cable.

Clause 5. The method of clause 4, wherein the first radar module includes a first electrical interface, the second radar module includes a second electrical interface, and the cable couples the first radar module and the second radar module via the first electrical interface and the second electrical interface.

Clause 6. The method of clause 1, wherein the first radar module includes a first clock circuit, and the second radar module includes a second clock circuit that is independently adjustable from the first clock circuit.

Clause 7. The method of clause 1, wherein the first radar module and the second radar module are configured to receive, via a first data interface and a second data interface respectively, a clock signal as an additional protocol or a capability of a data protocol.

Clause 8. The method of clause 7, wherein the clock signal is 40 MHz, 80 Mhz, or 1 GHz.

Clause 9. The method of clause 7, wherein the first radar module and the second radar module are communicably coupled via a cable, and the first radar module is further configured to: generate the clock signal; and provide the clock signal to the second radar module via the cable.

Clause 10. The method of clause 9, wherein the first radar module includes a first electrical interface, the second radar module includes a second electrical interface, and the cable couples the first radar module and the second radar module are coupled via the first electrical interface and the second electrical interface.

Clause 11. The method of clause 1, wherein the set of correction parameters include a difference in center frequency, a difference in FMCW ramp slope; a difference in chirp or frame start time; a difference in carrier phase, a difference in IF phase, or a difference in baseband phase; a phase noise sequence for one or more chirps; or a phase pi-ambiguity.

Clause 12. The method of clause 1, wherein the set of correction parameters are determined based on a correlation between a subset of the first digitized radar signal or a subset of the second digitized radar signal.

Clause 13. The method of clause 1, wherein the first radar module and the second radar module are mounted to a vehicle.

Clause 14. The method of clause 13, further comprising applying a roll to the second radar module relative to the first radar module such that the second radar module is rotated around a forward-looking axis.

Clause 15. The method of clause 14, wherein the second radar module is mounted upside down compared to the first radar module.

Clause 16. The method of clause 1, wherein the first radar module and the second radar module are configured with an antenna geometry such that a plurality of virtual bistatic channels includes at least one collocated antenna channel.

Clause 17. The method of clause 16, further comprising determining the set of correction parameters using a correlation among the at least one collocated antenna channel.

Clause 18. The method of clause 1, wherein the first radar module includes an antenna array, the second radar module includes the antenna array, and a rotation of the second radar module increases a density and/or aperture of an overall virtual array.

Clause 19. The method of clause 1, further comprising determining the set of correction parameters by solving an optimization problem describing the first digitized radar signal and the second digitized radar signal.

Clause 20. The method of clause 19, wherein the optimization problem uses common targets in the environment to determine the set of correction parameters between the first digitized radar signal and the second digitized radar signal.

Clause 21. The method of clause 20, wherein the optimization problem jointly solves for the set of correction parameters and parameters describing the common targets.

Clause 22. The method of clause 20, wherein the optimization problem enforces coherence between the first digitized radar signal and the second digitized radar signal by constraining the optimization problem with a consistent complex gain for each target of the common targets.

Clause 23. The method of clause 1, further comprising determining the set of correction parameters jointly with reconstructing a coherent radar spectrum across the first digitized radar signal and the second digitized radar signal or an incoherent radar spectrum across the first digitized radar signal and the second digitized radar signal.

Clause 24. The method of clause 1, wherein the set of correction parameters include a relative extrinsic between the first radar module and the second radar module; a plurality of relative intrinsic parameters for each antenna channel; or an antenna sidelobe pattern.

Clause 25. The method of clause 1, wherein the set of correction parameters includes at least one partition, and the method further comprising: determining, sequentially or alternatingly, the set of correction parameters or the at least one partition, and determining, jointly, a plurality of subsequent subsets of the at least one partition.

Clause 26. The method of clause 1, further comprising: determining a velocity based on a partition of the set of correction parameters, and refining the set of correction parameters based on the velocity.

Clause 27. The method of clause 1, further comprising determining a hardware correction parameter based on the set of correction parameters.

Clause 28. The method of clause 27, further comprising: providing the hardware correction parameter to at least one of the first radar module or the second radar module via a first data interface or a second data interface respectively, wherein the first radar module is configured to apply the hardware correction parameter to a first hardware circuit, and the second radar module is configured to apply the hardware correction parameter to a second hardware circuit.

Clause 29. The method of clause 27, wherein the hardware correction parameter is a trigger delay for at least one of the first radar module and the second radar module.

Clause 30. The method of clause 29, further comprising providing the trigger delay to at least one of the first radar module and the second radar module, wherein the first radar module is further configured to configure a first delay in a first trigger delay circuit based on the trigger delay, and the second radar module is further configured to configure a second delay in a second trigger delay circuit based on the trigger delay.

Clause 31. The method of clause 27, wherein the hardware correction parameter is a frequency offset or a phase offset for at least one of the first radar module and the second radar module.

Clause 32. The method of clause 31, further comprising providing the frequency offset or the phase offset to at least one of the first radar module and the second radar module, wherein the first radar module is further configured to adjust a first clock generation circuit or a first clock adjustment circuit based on the frequency offset or the phase offset, and the second radar module is further configured to adjust a second clock generation circuit or a second clock adjustment circuit based on the frequency offset or the phase offset.

Clause 33. The method of clause 27, wherein the hardware correction parameter is a chirp waveform parameter for at least one of the first radar module and the second radar module.

Clause 34. The method of clause 33, further comprising providing the chirp waveform parameter to at least one of the first radar module and the second radar module, wherein the first radar module is further configured to adjust a first radar waveform generator based on the chirp waveform parameter, and the second radar module is further configured to adjust a second radar waveform generator based on the chirp waveform parameter.

Clause 35. The method of clause 1, wherein the first corrected radar signal and the second corrected radar signal are each determined by applying the set of correction parameters to the first digitized radar signal and the second digitized radar signal respectively.

Clause 36. The method of clause 35, further comprising determining the set of correction parameters upon a booting of at least one of the first radar module, the second radar module, and the electronic processor.

Clause 37. The method of clause 35, further comprising determining the set of correction parameters while at least one of the first radar module and the second radar module are in operation.

Clause 38. The method of clause 35, wherein a subset of the set of correction parameters is determined during manufacturing or assembly of at least one of the first radar module and the second radar module.

Clause 39. The method of clause 38, further comprising determining the subset of the set of correction parameters based on a known target orientation or disposition in the environment around a radar signal processing system or a known radar motion.

Clause 40. The method of clause 1, further comprising combining the first corrected radar signal and the second corrected radar signal into the combined radar signal by: computing a joint beamformer over the first corrected radar signal and the second corrected radar signal, fitting a parametric target model jointly to the first corrected radar signal and the second corrected radar signal, incoherently summing the first corrected radar signal and the second corrected radar signal, determining a plurality of dominant target parameters associated with a dominant target and subtracting the plurality of dominant target parameters from the first corrected radar signal and the second corrected radar signal, interpolating or extrapolating the first corrected radar signal and the second corrected radar signal across real or virtual antenna locations, or reconstructing the radar spectrum coherently to the first corrected radar signal and the second corrected radar signal.

Clause 41. The method of clause 40, wherein the combined radar signal is further processed by performing target detection or target parameter estimation.

Clause 42. The method of clause 41, further comprising determining the scene representation of the environment by determining one or more properties of one or more targets in the environment.

Clause 43. The method of clause 42, wherein the one or more properties include an azimuth angle or elevation angle of the one or more targets in the environment.

Clause 44. The method of clause 1, wherein the scene representation of the environment includes one or more of a target list, an object list, a detection list, a two-dimensional 2D point cloud, a 3D point cloud, a point cloud with additional metadata such as radial velocity or time, a list of object bounding boxes, an occupancy grid, a tracking system, a free space map, a drivable area map, a range-Doppler spectrum, a shadow map, an occlusion map, a cluster of points, or a beam spectrum.

Clause 45. The method of clause 1, wherein the first radar module and the second radar module are mounted on a common bracket.

Clause 46. The method of clause 1, wherein the first radar module and the second radar module are mounted on separate brackets.

Clause 47. The method of clause 1, wherein the first radar module and the second radar module are mounted with different orientations, with arbitrary three-dimensional offsets between them, or with different fields of view.

Clause 48. The method of clause 1, wherein the first radar module is front-facing and the second radar module is front-facing.

Clause 49. The method of clause 1, wherein the first radar module is corner-facing, and the second radar module is front-facing.

Clause 50. The method of clause 1, wherein the first radar module and the second radar module are modulated with a time-multiplexed MIMO configuration.

Clause 51. The method of clause 1, wherein the first radar module and the second radar module are modulated with a code-multiplexed MIMO configuration.

Clause 52. The method of clause 1, wherein the first digitized radar signal includes a first indication of at least one object in the environment, and the second digitized radar signal includes a second indication of at least one object in the environment.

Clause 53. A radar signal processing system, comprising: the first radar module configured to provide, via a first data interface, the first digitized radar signal of the environment; the second radar module configured to provide, via a second data interface, the second digitized radar signal of the environment; and an electronic processor communicably coupled to the first radar module via the first data interface and the second radar module via the second data interface, the electronic processor configured to perform the method of any one of clauses 1-52.

Clause 54. A non-transitory computer-readable medium including instructions that, when executed by an electronic processor, cause a computing system to perform the method of any one of clauses 1-52.

What is claimed is:

1. A radar signal processing system, comprising:
a first radar module configured to provide, via a first data interface, a first digitized radar signal of an environment;
a second radar module configured to provide, via a second data interface, a second digitized radar signal of the environment; and
an electronic processor communicably coupled to the first radar module via the first data interface and the second radar module via the second data interface, the electronic processor configured to perform a method comprising:
receiving, from the first radar module via the first data interface, the first digitized radar signal of the environment;
receiving, from the second radar module via the second data interface, the second digitized radar signal of the environment;
processing the first digitized radar signal and the second digitized radar signal to determine a set of correction parameters;
determining a first corrected radar signal by applying the set of correction parameters to the first digitized radar signal;
determining a second corrected radar signal by applying the set of correction parameters to the second digitized radar signal;
combining the first corrected radar signal and the second corrected radar signal into a combined radar signal, and
determining a scene representation of the environment based on the combined radar signal.

2. The radar signal processing system of claim 1, wherein the first radar module and the second radar module are further configured to receive, via the first data interface or the second data interface respectively, a timing signal or a trigger as an additional protocol or a capability of a data protocol.

3. The radar signal processing system of claim 2, wherein the trigger is precise to within a value between 1 nanosecond (ns) and 50 ns between the first radar module and the second radar module.

4. The radar signal processing system of claim 2, wherein the first radar module and the second radar module are communicably coupled via a cable, and
the first radar module is further configured to:
generate the timing signal or the trigger; and
provide the timing signal or the trigger to the second radar module via the cable.

5. The radar signal processing system of claim 1, wherein the first radar module and the second radar module are configured to receive, via the first data interface and the second data interface respectively, a clock signal as an additional protocol or a capability of a data protocol.

6. The radar signal processing system of claim 5, wherein the clock signal is 40 Megahertz (MHz), 80 Mhz, or 1 gigahertz (GHz).

7. The radar signal processing system of claim 5, wherein the first radar module and the second radar module are communicably coupled via a cable, and
the first radar module is further configured to:
generate the clock signal; and
provide the clock signal to the second radar module via the cable.

8. The radar signal processing system of claim 7, wherein the first radar module includes a first electrical interface, the second radar module includes a second electrical interface, and the cable couples the first radar module and the second radar module are coupled via the first electrical interface and the second electrical interface.

9. The radar signal processing system of claim 1, wherein the first radar module includes a first clock circuit, and the second radar module includes a second clock circuit that is independently adjustable from the first clock circuit.

10. The radar signal processing system of claim 1, further comprising:

providing the scene representation of the environment to an autonomous driving system.

11. The radar signal processing system of claim 1, wherein the first radar module and the second radar module are configured with an antenna geometry such that a plurality of virtual bistatic channels includes at least one collocated antenna channel.

12. The radar signal processing system of claim 11, further comprising determining the set of correction parameters using a correlation among the at least one collocated antenna channel.

13. The radar signal processing system of claim 1, wherein the first radar module and the second radar module are mounted to a vehicle.

14. The radar signal processing system of claim 13, wherein the second radar module is mounted upside down compared to the first radar module.

15. The radar signal processing system of claim 1, wherein the first radar module is front-facing and the second radar module is front-facing, or the first radar module is corner-facing, and the second radar module is front-facing.

16. The radar signal processing system of claim 1, wherein the first radar module includes an antenna array, the second radar module includes the antenna array, and the second radar module is mounted in a position that is rotated compared to the first radar module to increases a density or an aperture of an overall virtual array.

17. A non-transitory computer-readable medium including instructions that, when executed by an electronic processor, cause a computing system to perform a method comprising:

receiving, from a first radar module via a first data interface, a first digitized radar signal of an environment;

receiving, from a second radar module via a second data interface, a second digitized radar signal of the environment;

processing the first digitized radar signal and the second digitized radar signal to determine a set of correction parameters;

determining a first corrected radar signal by applying the set of correction parameters to the first digitized radar signal;

determining a second corrected radar signal by applying the set of correction parameters to the second digitized radar signal;

combining the first corrected radar signal and the second corrected radar signal into a combined radar signal; and determining a scene representation of the environment based on the combined radar signal.

18. The non-transitory computer-readable medium of claim 17, wherein the scene representation of the environment includes one or more of a target list, an object list, a detection list, a two-dimensional (2D) point cloud, a three-dimensional (3D) point cloud, a point cloud with additional metadata such as radial velocity or time, a list of object bounding boxes, an occupancy grid, a tracking system, a free space map, a drivable area map, a range-Doppler spectrum, a shadow map, an occlusion map, a cluster of points, or a beam spectrum.

19. The non-transitory computer-readable medium of claim 17, wherein the method further comprises determining a hardware correction parameter based on the set of correction parameters.

20. The non-transitory computer-readable medium of claim 19, wherein the method further comprises:

providing the hardware correction parameter to at least one of the first radar module or the second radar module via the first data interface or the second data interface respectively, and at least one of the first radar module or the second radar module is configured to apply the hardware correction parameter to a respective hardware circuit.

21. The non-transitory computer-readable medium of claim 19, wherein the hardware correction parameter is a trigger delay for at least one of the first radar module and the second radar module, the method further comprises providing the trigger delay to at least one of the first radar module and the second radar module, and at least one of the first radar module or the second radar module is configured to configure a delay in a respective trigger delay circuit based on the trigger delay.

22. The non-transitory computer-readable medium of claim 19, wherein the hardware correction parameter is a frequency offset or a phase offset for at least one of the first radar module and the second radar module, the method further comprises providing the frequency offset or the phase offset to at least one of the first radar module and the second radar module, and at least one of the first radar module or the second radar module is configured to adjust a respective clock generation circuit or a respective clock adjustment circuit based on the frequency offset or the phase offset.

23. The non-transitory computer-readable medium of claim 19, wherein the hardware correction parameter is a chirp waveform parameter for at least one of the first radar module and the second radar module, the method further comprises providing the chirp waveform parameter to at least one of the first radar module and the second radar module, and at least one of the first radar module or the second radar module is configured to adjust a respective radar waveform generator based on the chirp waveform parameter.

24. A computer-implemented method for processing radar signals, the computer-implemented method being executed by an electronic processor and comprising:

receiving, from a first radar module, a first digitized radar signal of an environment; receiving, from a second radar module, a second digitized radar signal of the environment;

processing the first digitized radar signal and the second digitized radar signal to determine a set of correction parameters;

determining a first corrected radar signal by applying the set of correction parameters to the first digitized radar signal;

determining a second corrected radar signal by applying the set of correction parameters to the second digitized radar signal;

combining the first corrected radar signal and the second corrected radar signal into a combined radar signal; and determining a scene representation of the environment based on the combined radar signal.

25. The computer-implemented method of claim 24, wherein the set of correction parameters include a difference in center frequency, a difference in frequency modulated continuous wave (FMCW) ramp slope; a difference in chirp or frame start time; a difference in carrier phase, a difference in intermediate frequency (IF) phase, or a difference in baseband phase; a phase noise sequence for one or more chirps; or a phase pi-ambiguity.

26. The computer-implemented method of claim 24, wherein the set of correction parameters are determined based on a correlation between a subset of the first digitized radar signal or a subset of the second digitized radar signal.

27. The computer-implemented method of claim 24, further comprising combining the first corrected radar signal and the second corrected radar signal into the combined radar signal by:

computing a joint beamformer over the first corrected radar signal and the second corrected radar signal, fitting a parametric target model jointly to the first corrected radar signal and the second corrected radar signal, incoherently summing the first corrected radar signal and the second corrected radar signal, determining a plurality of dominant target parameters associated with a dominant target and subtracting the plurality of dominant target parameters from the first corrected radar signal and the second corrected radar signal, interpolating or extrapolating the first corrected radar signal and the second corrected radar signal across real or virtual antenna locations, or reconstructing the radar spectrum coherently to the first corrected radar signal and the second corrected radar signal.

28. The computer-implemented method of claim 27, further comprising:

performing target detection or target parameter estimation by processing the combined radar signal, and determining the scene representation of the environment by determining one or more properties of one or more targets in the environment.

29. The computer-implemented method of claim 28, wherein the one or more properties include an azimuth angle or elevation angle of the one or more targets in the environment.

30. The computer-implemented method of claim 24, wherein the first corrected radar signal and the second corrected radar signal are each determined by applying the set of correction parameters to the first digitized radar signal and the second digitized radar signal respectively.

* * * * *